US008197335B2

(12) United States Patent
DeWaal et al.

(10) Patent No.: US 8,197,335 B2
(45) Date of Patent: Jun. 12, 2012

(54) GAMING SYSTEM, GAMING DEVICE, AND METHOD FOR ENABLING A CURRENT BET TO BE PLACED ON A FUTURE PLAY OF A WAGERING GAME

(75) Inventors: Daniel J. DeWaal, Las Vegas, NV (US); Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 786 days.

(21) Appl. No.: 12/271,592

(22) Filed: Nov. 14, 2008

(65) Prior Publication Data

US 2010/0124973 A1 May 20, 2010

(51) Int. Cl.
*A63F 13/10* (2006.01)

(52) U.S. Cl. ........................................... 463/25; 463/20

(58) Field of Classification Search .................... 463/20, 463/30, 25, 42
See application file for complete search history.

(56) References Cited

U.S. PATENT DOCUMENTS

| | | | |
|---|---|---|---|
| 4,167,413 | A | 9/1979 | Christ et al. |
| 4,448,419 | A | 5/1984 | Telnaes |
| 4,826,169 | A | 5/1989 | Bessho et al. |
| 4,836,546 | A | 6/1989 | Dire |
| 4,836,553 | A | 6/1989 | Suttle et al. |
| 5,019,973 | A | 5/1991 | Wilcox et al. |
| 5,100,137 | A | 3/1992 | Fulton |
| 5,152,529 | A | 10/1992 | Okada |
| 5,167,413 | A | 12/1992 | Fulton |
| 5,178,390 | A | 1/1993 | Okada |
| 5,251,897 | A | 10/1993 | Fulton |
| 5,259,616 | A | 11/1993 | Bergmann |
| 5,342,049 | A | 8/1994 | Wichinsky et al. |
| 5,356,140 | A | 10/1994 | Dabrowski et al. |
| 5,382,025 | A | 1/1995 | Sklansky et al. |
| 5,395,119 | A | 3/1995 | Jacob et al. |
| 5,397,128 | A | 3/1995 | Hesse et al. |
| 5,411,257 | A | 5/1995 | Fulton |

(Continued)

FOREIGN PATENT DOCUMENTS

AU 199716432 9/1997

(Continued)

OTHER PUBLICATIONS

Arcade History website, http://www.arcade-history.com/history database.php . . . , 2000-2006.

(Continued)

*Primary Examiner* — Peter DungBa Vo
*Assistant Examiner* — Damon Pierce
(74) *Attorney, Agent, or Firm* — Neal, Gerber & Eisenberg LLP

(57) ABSTRACT

The gaming system, gaming device, and gaming method disclosed herein provide an opportunity for a player to place a replay wager for a group or set of a plurality of plays of a wagering game. In one embodiment, the replay wager activates a replay feature which the player can use a designated number of times (such as one time) over the plurality of plays of the wagering game. The player's use of the replay feature causes the gaming system to redisplay the previous play of the wagering game, and provide any awards associated with the previous play of the wagering game. After the player uses the replay feature over each of the designated number (such as one) of the plurality of plays of the wagering game, the player cannot use the replay feature for any of the remaining plays of the plurality of plays of the wagering game.

10 Claims, 31 Drawing Sheets

U.S. PATENT DOCUMENTS

| | | | |
|---|---|---|---|
| 5,415,404 | A | 5/1995 | Joshi et al. |
| 5,511,781 | A | 4/1996 | Wood et al. |
| 5,524,888 | A | 6/1996 | Heidel |
| 5,542,669 | A | 8/1996 | Charron et al. |
| 5,570,885 | A | 11/1996 | Ornstein |
| 5,584,764 | A | 12/1996 | Inoue |
| 5,593,161 | A | 1/1997 | Boylan et al. |
| 5,704,835 | A | 1/1998 | Dietz, II |
| 5,711,715 | A | 1/1998 | Ringo et al. |
| 5,718,431 | A | 2/1998 | Ornstein |
| 5,720,662 | A | 2/1998 | Holmes, Jr. et al. |
| 5,732,950 | A | 3/1998 | Moody |
| 5,775,692 | A | 7/1998 | Watts et al. |
| 5,810,360 | A | 9/1998 | Srichayaporn |
| 5,816,916 | A | 10/1998 | Moody |
| 5,820,460 | A | 10/1998 | Fulton |
| 5,823,873 | A | 10/1998 | Moody |
| 5,851,148 | A | 12/1998 | Brune et al. |
| 5,882,258 | A | 3/1999 | Kelly et al. |
| 5,882,261 | A | 3/1999 | Adams |
| 5,911,418 | A | 6/1999 | Adams |
| 5,911,419 | A | 6/1999 | Delaney et al. |
| 5,919,088 | A | 7/1999 | Weiss |
| 5,935,002 | A | 8/1999 | Falciglia |
| 5,944,315 | A | 8/1999 | Mostashari |
| 5,951,012 | A | 9/1999 | Feola |
| 5,954,335 | A | 9/1999 | Moody |
| 5,984,782 | A | 11/1999 | Inoue |
| 6,004,207 | A | 12/1999 | Wilson, Jr. et al. |
| 6,012,983 | A | 1/2000 | Walker et al. |
| 6,019,374 | A | 2/2000 | Breeding |
| 6,029,976 | A | 2/2000 | Brunelle |
| 6,033,307 | A | 3/2000 | Vancura |
| 6,059,289 | A | 5/2000 | Vancura |
| 6,062,980 | A | 5/2000 | Luciano |
| 6,065,753 | A | 5/2000 | Morosky |
| 6,077,163 | A | 6/2000 | Walker et al. |
| 6,086,066 | A | 7/2000 | Takeuchi et al. |
| 6,089,976 | A | 7/2000 | Schneider et al. |
| 6,093,102 | A | 7/2000 | Bennett |
| 6,098,985 | A | 8/2000 | Moody |
| 6,102,400 | A | 8/2000 | Scott et al. |
| 6,102,798 | A | 8/2000 | Bennett |
| 6,113,103 | A | 9/2000 | Mostashari |
| 6,126,542 | A | 10/2000 | Fier |
| 6,132,311 | A | 10/2000 | Williams |
| 6,146,273 | A | 11/2000 | Olsen |
| 6,179,291 | B1 | 1/2001 | Vancura |
| 6,179,711 | B1 | 1/2001 | Yoseloff |
| 6,189,888 | B1 | 2/2001 | Brunelle |
| 6,190,255 | B1 | 2/2001 | Thomas et al. |
| 6,203,010 | B1 | 3/2001 | Jorasch et al. |
| 6,203,429 | B1 | 3/2001 | Demar et al. |
| 6,210,279 | B1 | 4/2001 | Dickinson |
| 6,213,876 | B1 | 4/2001 | Moore, Jr. |
| 6,224,483 | B1 | 5/2001 | Mayeroff |
| 6,234,897 | B1 | 5/2001 | Frohm et al. |
| 6,244,957 | B1 | 6/2001 | Walker et al. |
| 6,254,483 | B1 | 7/2001 | Acres |
| 6,267,669 | B1 | 7/2001 | Luciano, Jr. et al. |
| 6,270,079 | B1 | 8/2001 | Chamberlain |
| 6,270,405 | B1 | 8/2001 | Ferguson |
| 6,270,412 | B1 | 8/2001 | Crawford et al. |
| 6,273,424 | B1 | 8/2001 | Breeding |
| 6,283,474 | B1 | 9/2001 | De Keller |
| 6,302,790 | B1 | 10/2001 | Brossard |
| 6,305,686 | B1 | 10/2001 | Perrie et al. |
| 6,311,979 | B1 | 11/2001 | Andrews |
| 6,312,334 | B1 | 11/2001 | Yoseloff |
| 6,315,662 | B1 | 11/2001 | Jorasch et al. |
| 6,319,122 | B1 | 11/2001 | Packes, Jr. et al. |
| 6,319,124 | B1 | 11/2001 | Baerlocher |
| 6,319,127 | B1 | 11/2001 | Walker et al. |
| 6,328,649 | B1 | 12/2001 | Randall et al. |
| 6,336,860 | B1 | 1/2002 | Webb |
| 6,342,007 | B1 | 1/2002 | Wood et al. |
| 6,347,996 | B1 | 2/2002 | Gilmore et al. |
| 6,364,765 | B1 | 4/2002 | Walker et al. |
| 6,398,218 | B1 | 6/2002 | Vancura |
| 6,398,220 | B1 | 6/2002 | Inoue |
| 6,406,020 | B1 | 6/2002 | Reed |
| 6,413,162 | B1 | 7/2002 | Baerlocher et al. |
| 6,435,506 | B1 | 8/2002 | Piccoli |
| 6,435,511 | B1 | 8/2002 | Vancura et al. |
| 6,439,995 | B1 | 8/2002 | Hughs-Baird et al. |
| 6,443,452 | B1 | 9/2002 | Brune |
| 6,446,971 | B1 | 9/2002 | Baranauskas |
| 6,461,241 | B1 | 10/2002 | Webb et al. |
| 6,471,208 | B2 | 10/2002 | Yoseloff et al. |
| 6,511,068 | B1 | 1/2003 | Sklansky et al. |
| 6,523,829 | B1 | 2/2003 | Walker et al. |
| 6,533,273 | B2 | 3/2003 | Cole et al. |
| 6,537,150 | B1 | 3/2003 | Luciano et al. |
| 6,540,230 | B1 | 4/2003 | Walker et al. |
| 6,561,897 | B1 | 5/2003 | Bourbour et al. |
| 6,569,013 | B1 | 5/2003 | Taylor |
| 6,569,015 | B1 | 5/2003 | Baerlocher et al. |
| 6,575,830 | B2 | 6/2003 | Baerlocher et al. |
| 6,585,588 | B2 | 7/2003 | Hartl |
| 6,589,114 | B2 | 7/2003 | Rose |
| 6,595,854 | B2 | 7/2003 | Hughs-Baird et al. |
| 6,612,574 | B1 | 9/2003 | Cole et al. |
| 6,612,575 | B1 | 9/2003 | Cole et al. |
| 6,612,927 | B1 | 9/2003 | Slomiany et al. |
| 6,634,942 | B2 | 10/2003 | Walker et al. |
| 6,634,945 | B2 | 10/2003 | Glavich et al. |
| 6,659,864 | B2 | 12/2003 | McGahn et al. |
| 6,676,512 | B2 | 1/2004 | Fong et al. |
| 6,679,497 | B2 | 1/2004 | Walker et al. |
| 6,726,204 | B2 | 4/2004 | Inoue |
| 6,726,563 | B1 | 4/2004 | Baerlocher et al. |
| 6,746,016 | B2 | 6/2004 | Perrie et al. |
| 6,786,824 | B2 | 9/2004 | Cannon |
| 6,793,575 | B2 | 9/2004 | Brown et al. |
| 6,802,773 | B2 | 10/2004 | Moody et al. |
| 6,811,486 | B1 | 11/2004 | Luciano, Jr. |
| 6,827,348 | B1 | 12/2004 | Mitchell |
| 6,832,957 | B2 | 12/2004 | Falconer |
| 6,875,108 | B1 | 4/2005 | Hughs-Baird |
| 6,913,531 | B1 | 7/2005 | Yoseloff |
| 6,913,532 | B2 | 7/2005 | Baerlocher et al. |
| 6,923,446 | B2 | 8/2005 | Snow |
| 6,926,607 | B2 | 8/2005 | Slomiany et al. |
| 6,932,340 | B1 | 8/2005 | Schaefer et al. |
| 6,938,900 | B2 | 9/2005 | Snow |
| 6,955,600 | B2 | 10/2005 | Glavich et al. |
| 6,960,133 | B1 | 11/2005 | Marks et al. |
| 6,964,611 | B2 | 11/2005 | Packes, Jr. et al. |
| 6,969,317 | B2 | 11/2005 | Walker et al. |
| 7,001,274 | B2 | 2/2006 | Baerlocher et al. |
| 7,007,953 | B1 | 3/2006 | Cabot |
| 7,011,581 | B2 | 3/2006 | Cole et al. |
| 7,014,560 | B2 | 3/2006 | Glavich et al. |
| 7,066,814 | B2 | 6/2006 | Glavich et al. |
| 7,094,148 | B2 | 8/2006 | Baerlocher et al. |
| 7,140,614 | B2 | 11/2006 | Snow |
| 7,140,964 | B2 | 11/2006 | Walker et al. |
| 7,156,739 | B2 | 1/2007 | Walker et al. |
| 7,267,611 | B2 | 9/2007 | Slomiany et al. |
| 7,322,887 | B2 | 1/2008 | Belger et al. |
| 7,329,182 | B2 | 2/2008 | Adams et al. |
| 7,393,278 | B2 | 7/2008 | Gerson et al. |
| 7,618,316 | B2 | 11/2009 | Cole et al. |
| 2001/0046890 | A1 | 11/2001 | Ferguson |
| 2002/0010022 | A1 | 1/2002 | Vincent |
| 2002/0027322 | A1 | 3/2002 | Breeding et al. |
| 2002/0045475 | A1 | 4/2002 | Glavich et al. |
| 2002/0132660 | A1 | 9/2002 | Taylor |
| 2002/0147040 | A1 | 10/2002 | Walker et al. |
| 2002/0198042 | A1 | 12/2002 | Webb et al. |
| 2003/0008698 | A1 | 1/2003 | Stone |
| 2003/0040355 | A1 | 2/2003 | Baerlocher |
| 2003/0060249 | A1 | 3/2003 | Guamieri |
| 2003/0060268 | A1 | 3/2003 | Falconer |
| 2003/0060272 | A1 | 3/2003 | Glavich et al. |
| 2003/0114217 | A1 | 6/2003 | Walker et al. |
| 2003/0134242 | A1 | 7/2003 | Hart et al. |

2003/0162585 A1 8/2003 Bigelow, Jr. et al.
2003/0203753 A1 10/2003 Muir et al.
2003/0207713 A1 11/2003 Taylor
2003/0216165 A1 11/2003 Singer et al.
2004/0012145 A1 1/2004 Inoue
2004/0014516 A1 1/2004 Inoue
2004/0014517 A1 1/2004 Inoue
2004/0018866 A1 1/2004 Inoue
2004/0026854 A1 2/2004 Inoue
2004/0036218 A1 2/2004 Inoue
2004/0038724 A1 2/2004 Van Asdale
2004/0038726 A1 2/2004 Inoue
2004/0048644 A1 3/2004 Gerrard et al.
2004/0048650 A1 3/2004 Mierau et al.
2004/0053672 A1 3/2004 Baerlocher
2004/0061288 A1 4/2004 Snow et al.
2004/0063492 A1 4/2004 Baerlocher et al.
2004/0084843 A1 5/2004 Snow
2004/0090003 A1 5/2004 Snow
2004/0090005 A1 5/2004 Snow
2004/0102238 A1 5/2004 Taylor
2004/0106449 A1 6/2004 Walker et al.
2004/0147306 A1 7/2004 Randall et al.
2004/0147308 A1 7/2004 Walker et al.
2004/0147314 A1 7/2004 LeMay et al.
2004/0171416 A1 9/2004 Baerlocher et al.
2004/0171420 A1 9/2004 Baerlocher et al.
2004/0217548 A1 11/2004 Snow
2004/0219969 A1 11/2004 Casey et al.
2005/0029744 A1 2/2005 Yoseloff et al.
2005/0040601 A1 2/2005 Yoseloff et al.
2005/0051958 A1 3/2005 Snow
2005/0051960 A1 3/2005 Snow
2005/0059452 A1 3/2005 Hartl
2005/0059473 A1 3/2005 Gomez et al.
2005/0070354 A1 3/2005 Baerlocher et al.
2005/0075163 A1 4/2005 Cuddy et al.
2005/0085294 A1 4/2005 Walker et al.
2005/0085295 A1 4/2005 Walker et al.
2005/0101376 A1 5/2005 Walker et al.
2005/0101379 A1 5/2005 Falconer
2005/0110215 A1 5/2005 Jackson
2005/0215311 A1 9/2005 Hornik et al.
2005/0233801 A1 10/2005 Baerlocher et al.
2005/0250578 A1 11/2005 Slomiany et al.
2005/0266917 A1 12/2005 Glavich et al.
2005/0277460 A1 12/2005 Inoue
2006/0009275 A1 1/2006 Packes, Jr. et al.
2006/0025209 A1 2/2006 Walker et al.
2006/0035697 A1 2/2006 Packes et al.
2006/0035701 A1 2/2006 Walker et al.
2006/0046835 A1 3/2006 Walker et al.
2006/0068884 A1 3/2006 Baerlocher et al.
2006/0068885 A1 3/2006 Cregan et al.
2006/0068903 A1 3/2006 Walker et al.
2006/0073876 A1 4/2006 Cuddy
2006/0084486 A1 4/2006 Belger et al.
2006/0084494 A1 4/2006 Belger et al.
2006/0089195 A1 4/2006 Walker et al.
2006/0119044 A1 6/2006 Kekempano et al.
2006/0142077 A1 6/2006 Miles et al.
2006/0172794 A1 8/2006 Walker et al.
2006/0217177 A1 9/2006 Walker et al.
2006/0217190 A1 9/2006 Walker et al.
2006/0223629 A1 10/2006 Walker et al.
2006/0247030 A1 11/2006 Walker et al.
2006/0247031 A1 11/2006 Walker et al.
2006/0247041 A1 11/2006 Walker et al.
2006/0248025 A1 11/2006 Walker et al.
2006/0252502 A1 11/2006 Walker et al.
2006/0252509 A1 11/2006 Walker et al.
2006/0252510 A1 11/2006 Walker et al.
2006/0252511 A1 11/2006 Walker et al.
2006/0252512 A1 11/2006 Walker et al.
2006/0252542 A1 11/2006 Nicely
2006/0276245 A1 12/2006 Walker et al.
2006/0281519 A1 12/2006 Packes, Jr. et al.
2006/0281520 A1 12/2006 Packes, Jr. et al.
2006/0281521 A1 12/2006 Packes, Jr. et al.
2006/0287038 A1 12/2006 Walker et al.
2006/0287039 A1 12/2006 Walker et al.
2006/0287040 A1 12/2006 Walker et al.
2006/0287047 A1 12/2006 Walker et al.
2006/0287052 A1 12/2006 Packes, Jr. et al.
2006/0287070 A1 12/2006 Walker et al.
2006/0287071 A1 12/2006 Walker et al.
2006/0287074 A1 12/2006 Walker et al.
2006/0287075 A1 12/2006 Walker et al.
2007/0004502 A1 1/2007 Walker et al.
2007/0004503 A1 1/2007 Walker et al.
2007/0004504 A1 1/2007 Walker et al.
2007/0049372 A1 3/2007 Olivas et al.
2007/0054721 A1 3/2007 Jackson
2007/0069470 A1 3/2007 Snow
2007/0087818 A1 4/2007 Walker et al.
2007/0102882 A1 5/2007 Snow
2007/0117612 A1 5/2007 Walker et al.
2007/0142113 A1 6/2007 Walker et al.
2007/0155482 A1 7/2007 Walker et al.
2007/0155483 A1 7/2007 Walker et al.
2007/0155484 A1 7/2007 Walker et al.
2007/0197279 A1 8/2007 Packes, Jr. et al.
2007/0213123 A1 9/2007 Walker et al.
2007/0243934 A1 10/2007 Little et al.
2007/0249417 A1 10/2007 Packes, Jr. et al.
2007/0293293 A1 12/2007 Baerlocher et al.
2007/0298857 A1 12/2007 Schlottmann et al.
2008/0045344 A1 2/2008 Schlottmann et al.
2008/0064491 A1 3/2008 Taylor
2008/0064502 A1 3/2008 Schlottmann et al.
2008/0070680 A1 3/2008 Baerlocher et al.
2008/0070692 A1 3/2008 Schlottmann et al.
2008/0070693 A1 3/2008 Schlottmann et al.
2008/0070694 A1 3/2008 Schlottmann et al.
2008/0070695 A1 3/2008 Baerlocher et al.
2008/0108404 A1 5/2008 Iddings et al.
2008/0113761 A1 5/2008 Belger et al.
2008/0146325 A1 6/2008 Walker et al.

FOREIGN PATENT DOCUMENTS

AU A-50327/96 10/1997
AU 2003/244623 3/2004
AU 2004222759 5/2006
EP 0 753 331 1/1997
EP 0 798 676 10/1997
EP 0 874 337 9/1998
EP 0 926 645 6/1999
EP 0 944 030 9/1999
EP 0 945 837 9/1999
EP 0 984 407 3/2000
EP 1 184 822 3/2002
GB 1 464 896 2/1977
GB 2 106 292 8/1981
GB 2 083 936 3/1982
GB 2 086 631 5/1982
GB 2 090 690 7/1982
GB 2 096 376 10/1982
GB 2 097 160 10/1982
GB 2 098 781 11/1982
GB 2 100 905 1/1983
GB 2 105 891 3/1983
GB 2 117 155 10/1983
GB 2 137 392 10/1984
GB 2 161 008 1/1986
GB 2 170 643 8/1986
GB 2 180 087 3/1987
GB 2 181 589 4/1987
GB 2 183 882 6/1987
GB 2 191 030 12/1987
GB 2 201 821 9/1988
GB 2 222 712 3/1990
GB 2 225 889 6/1990
GB 2 226 436 6/1990
GB 2 242 300 9/1991
GB 2 262 642 6/1993
GB 2 328 311 2/1999
GB 2 335 524 9/1999

| | | |
|---|---|---|
| GB | 2 393 555 | 3/2004 |
| WO | WO 00/59591 | 10/2000 |
| WO | WO 2005/002690 | 1/2005 |

OTHER PUBLICATIONS

Aztec Temple MultiWay Article by Strictly Slots, published in Aug. 2005.
Barn Yard Article in Strictly Slots, published in Mar. 2002.
Bonus Times Article written by Strictly Slots, published in Jul. 2000.
Easy Street Advertisements and Articles written by Casino Data Systems, published in 2000.
Frome, Lenny, Winning Strategies for Video Poker, pp. 22 and 52, published in 1993.
Gold Fever Advertisement written by Atronic Casino Technology, Ltd., published in 1999.
Gold Fever Atronic Web Page written by Atronic Casino Technology, Ltd., published in Mar. 2002.
Jewel in the Crown Advertisement written by Barcrest Ltd., published in 1999.
Marshall Fey, Slot Machines a pictorial History of the First 100 Years, Liberty Belle Books, pp. 79, 150, 171, 231, published in 1983.
Marshall Fey, Slot Machines, A Pictorial History of the first 100 years, Draw Poker Dice (p. 74 to 75), 1997, fifth edition.
On the Money, Advertisement written by Strictly Slots, published in Dec. 2000.
Power Slotto, Article written by Strictly Slots, p. 51, published in Jul. 2001.
Roaring 20s, Article written by Strictly Slots, published in Aug. 2008.
Spin and Hold, Article in Strictly Slots, written by IGT, published in Jan. 2003.
Super Stars Spin, Article written by IGT, published in 2003.
Take Your Pick Advertisement written by IGT/Anchor Gaming, published in or before Dec. 1999.
Take Your Pick Article, Strictly Slots, published in Mar. 2001.
Vision Series™/Good Times™ Brochure written by IGT, published in or before Dec. 1999.
X Factor Brochure and Website Page written by WMG Gaming, Inc., published in or before Dec. 1998.

GAMING SYSTEM, GAMING DEVICE, AND METHOD FOR ENABLING A CURRENT BET TO BE PLACED ON A FUTURE PLAY OF A WAGERING GAME

BACKGROUND

Gaming devices provide enjoyment and excitement to players, in part, because they may ultimately lead to monetary awards for the players. Gaming devices also provide enjoyment and excitement to players because they are fun to play. Bonus features, in particular, provide gaming device manufacturers with the opportunity to add enjoyment and excitement to that which is already expected from a base game of the gaming device. Bonus features provide additional gaming experiences to the player.

Gaming devices in most jurisdictions are typically games of luck, not skill. They are configured on average to pay back a certain percentage of the amount of money wagered. The hit frequency in most wagering games is set high enough that any player who plays a few hands or spins of the reels wins on one of the games. That is, in most wagering games players are likely to achieve some level of success.

While the outcomes of wagering games are determined at least in part by luck, the player controls one important component, namely the wager or amount of the wager. Wagering games commonly require a minimum bet, for example, at least a nickel along one payline of a slot machine. The wagering games also have maximum wagers such as five nickels on each of the nine paylines of a slot machine or $0.25 per payline for a total maximum bet of $2.25 per play of the wagering game. For each play of the wagering game, the player decides how high to wager, for example, five cents or multiples thereof up to $0.25.

The ability to vary the wager provides the player with a sense of control. Increasing a wager during winning streaks and decreasing the wager during losing streaks benefits the player. The ability to vary the wager also benefits the casino because the ability provides control to the player, enhancing the gaming experience, without changing the average expected payback percentage of the wagering game.

It is therefore desirable to increase or enhance the player's control over the wager and the awards won, further enhancing the gaming experience, and to do so in a manner which is entertaining and encourages the player to play for longer periods of time.

SUMMARY

The gaming system, gaming device, and gaming method disclosed herein provide an opportunity for a player to place a replay wager for a group or set of a plurality of plays of a wagering game. In one embodiment, the replay wager activates a replay feature which the player can use or apply a designated number of times (such as one time) over the plurality of plays of the wagering game. The player's use of the replay feature causes the gaming system to redisplay the previous play of the wagering game, and provide any awards associated with the previous play of the wagering game. After the player uses the replay feature for each of the designated number (such as one) of the plurality of plays of the wagering game, the player cannot use the replay feature for any of the remaining plays of the plurality of plays of the wagering game. In various embodiments, the quantity of plays of the wagering game and the number of times the player can use the replay feature varies, provided that the designated number of replays is less than the quantity of plays of the wagering game.

In one embodiment, the gaming system requires the player to place a wager on each of a plurality of plays of the wagering game before playing any of the plurality of plays of the wagering game. For example, before displaying any plays of a group of five plays of the wagering game, the gaming system requires the player to place a total wager of fifty credits for the five plays of the wagering game. The fifty credit wager activates the replay feature for the group of five plays of the wagering game. The gaming system divides the fifty credit wager equally among each of the five plays of the wagering game such that each play of the wagering game is played at a wager of ten credits. It should be appreciated that for the player to activate the replay feature for the group of plays of the wagering game, the gaming system may require the player to place a replay wager in addition to the wager for the group of five plays of the wagering game. For example, in addition to the fifty credit wager for the five plays of the wagering game (i.e., 10 credits per play of the wagering game), the gaming system may require the player to place an additional wager of twenty credits to activate the replay for the five plays of the wagering game. The gaming system enables the player to enter the replay wager separately from the wager for the group of plays of the wagering game, or the gaming system enables the player to enter the replay wager together with the wager for the group of plays of the wagering game.

In another embodiment, the gaming system requires the player to place a wager before each play of the wagering game. For example, after placing the replay wager, the player places a wager for the first play of a group of five of plays of the wagering game. After the gaming system displays the outcome of the first play of the wagering game and enables the player to use the replay feature, the player may place a wager on the second play of the wagering game. After the player uses or applies the replay feature for one of the plays of the wagering game, the player may choose not to wager on and play any remaining plays of the group of plays of the wagering game. After the player uses the replay feature and before displaying the next play of the wagering game, the gaming system may enable the player to activate another replay feature. Alternatively, after the player uses the replay feature, the gaming system may enable the player to activate another replay feature only after the player wagers on and plays all remaining plays of the group of plays of the wagering game.

In various alternative embodiments, the gaming system enables the player to place the same wager or different wagers on each play of the wagering game, regardless of whether the gaming system requires the player to place a wager on each play of the wagering game (i.e., after seeing the outcome of the preceding play of the wagering game) or before playing any of the group of plays of the wagering game. In one embodiment, the gaming system requires the wager for the first play of the wagering game to be the same as the wager for each of the remaining plays of the group of plays of the wagering game. For example, if the gaming system requires the player to place a wager on each play of the wagering game before playing any of the group of plays of the wagering game, the gaming system may apply non-uniform portions of the wager to each of the plays of the wagering game (e.g., five credits for the first play, ten credits for the second play, etc.). It should be appreciated that the gaming system may randomly determine the portions of the wager to apply to each of the plays of the wagering game, or the gaming system may apply the portions of the wager based on a predetermined pattern or formula (e.g., apply a wager for each play of the wagering game which is equal to twice the wager applied for the previous play of the wagering game). Alternatively, the gaming system may enable the player to select which portion of the wager to apply to each play of the wagering game. In various alternative embodiments, the gaming system requires the player to place a minimum wager for each play of the wagering game, a maximum wager for each play of the wagering game, or a wager which is between a minimum wager and a maximum wager.

In one embodiment, the gaming system requires the player to select which of the plurality of plays to replay before playing any of the plurality of plays of the wagering game. For example, before displaying a play of the wagering game, the player wagers ten credits on each of the next five plays of the wagering game. The player also wagers an additional ten credits to activate a replay feature for the group of five plays of the wagering game. Before displaying an outcome for any of the group of five plays of the wagering game, the gaming system requires the player to choose which one or more of the five plays of the wagering game to replay. For example, if the player chooses to replay the fourth play of the wagering game, the gaming system displays each of the first four plays of the wagering game and provides the player with any awards associated with the outcome of each of the four plays of the wagering game. After displaying the fourth play of the wagering game and providing the player any awards associated with the outcome of the fourth play of the wagering game, the gaming system replays (i.e., redisplays) the fourth play of the wagering game and provides the player any awards associated with the outcome of the replay of the wagering game.

In another embodiment, the gaming system enables the player to use the replay feature after playing one or more of the plurality of plays of the wagering game (i.e., after seeing the outcome of one or more of the plurality of plays of the wagering game). For example, if the outcome of the first play of a group of five plays of the wagering game is not a winning outcome, the player may choose not to use the replay feature for the first play of the wagering game. If the outcome of the second play of the wagering game is a winning outcome (particularly if the outcome results in a large award for the player), the player may choose to replay the second play of the wagering game after seeing the outcome of the second play of the wagering game.

In an alternative embodiment, the gaming system enables the player to use the replay feature after playing all of the plays of the wagering game, and enables the player to select which of the previous plays to replay. For example, after the gaming system displays the outcome of each of the five plays of the wagering game, the player may choose the replay the third play of the wagering game (e.g., if the third play of the wagering game resulted in the greatest award for the five plays of the wagering game).

In an alternative presentation of the wagering game, instead of using a replay, the player can choose to use or apply a multiplier to one (or at least one) of the plays of the wagering game. In various alternative embodiments, the wagering game is provided as a primary wagering game or as a secondary or bonus game or event, including a plurality of plays of the primary wagering game.

Various embodiments of the gaming system present the replay feature as a modifier feature. The gaming system enables the player to place a modifier wager for a designated number of plays of the wagering game. The player can use the modifier feature to apply a modifier to one of the designated number of plays of the wagering game. For example, the gaming system enables the player to place a modifier wager to activate a 3× multiplier, which the player can apply to one the plurality of plays of the wagering game. If the player uses the 3× multiplier for a play of the wagering game, the gaming system awards the player three times the amount the player won as a result of playing the wagering game.

Additional features and advantages are described in, and will be apparent from, the following Detailed Description and the figures.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
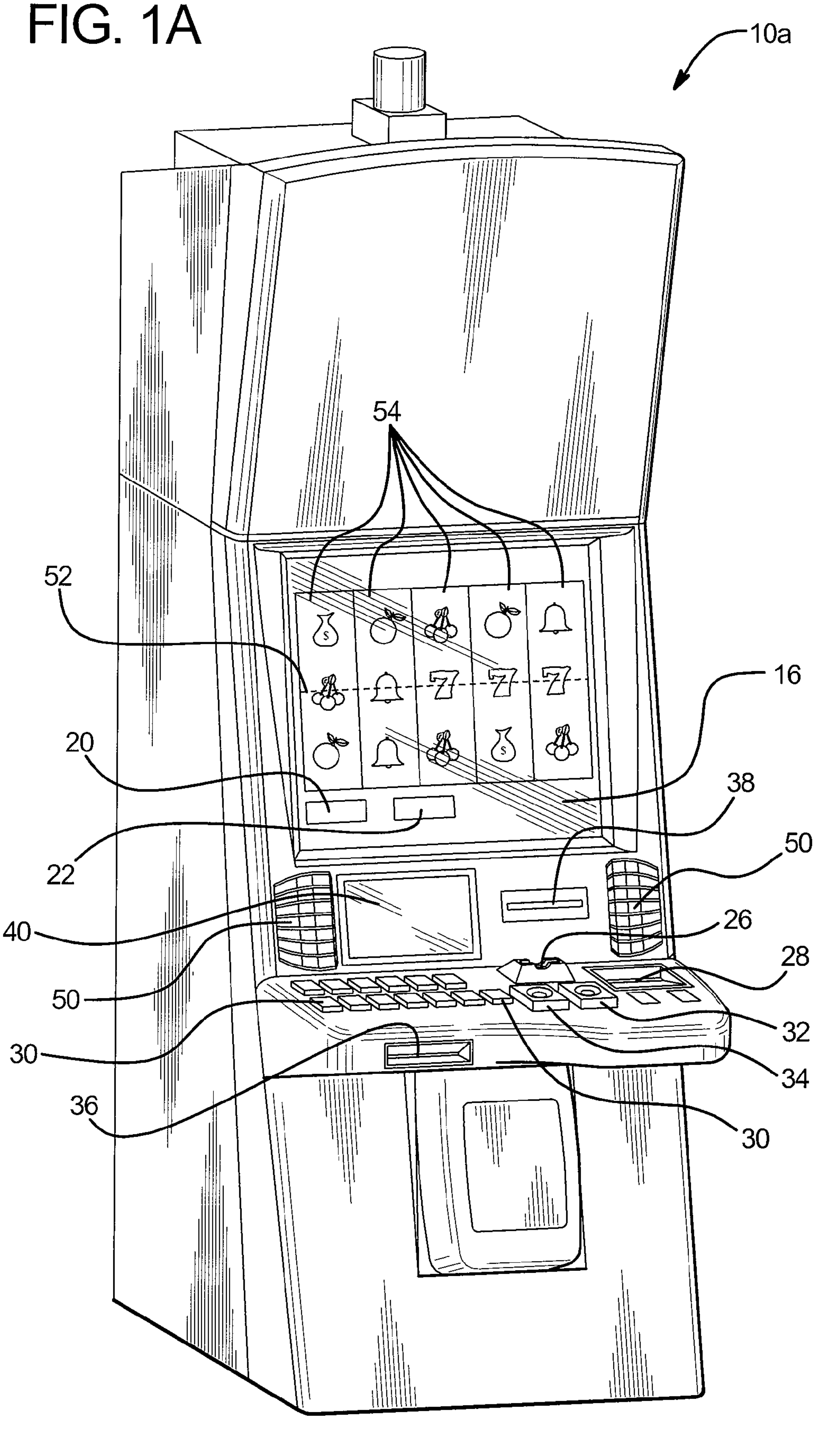
FIGS. 1A and 1B are front perspective views of alternative embodiments of gaming devices disclosed herein.
Figure 1B:
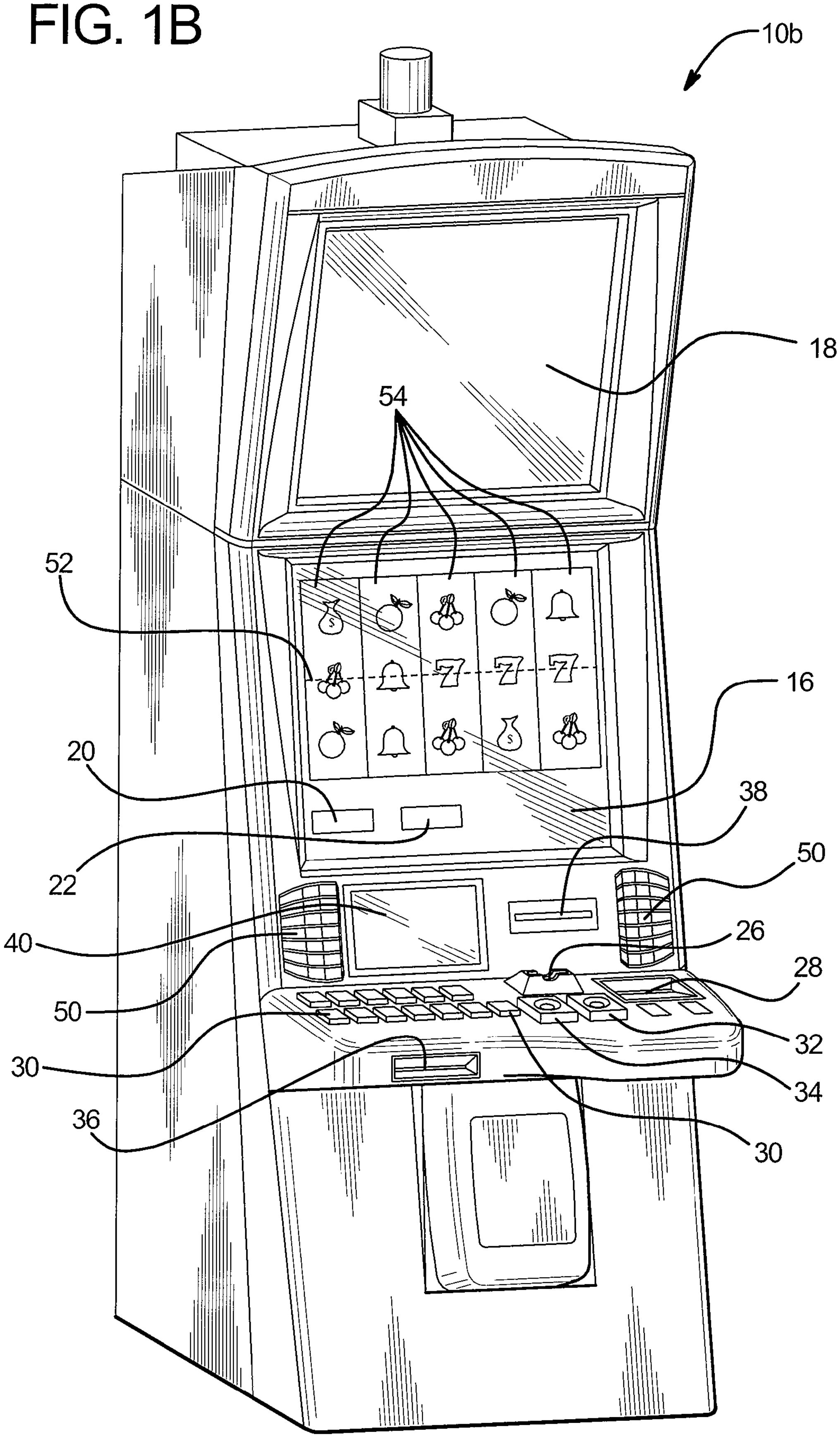

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
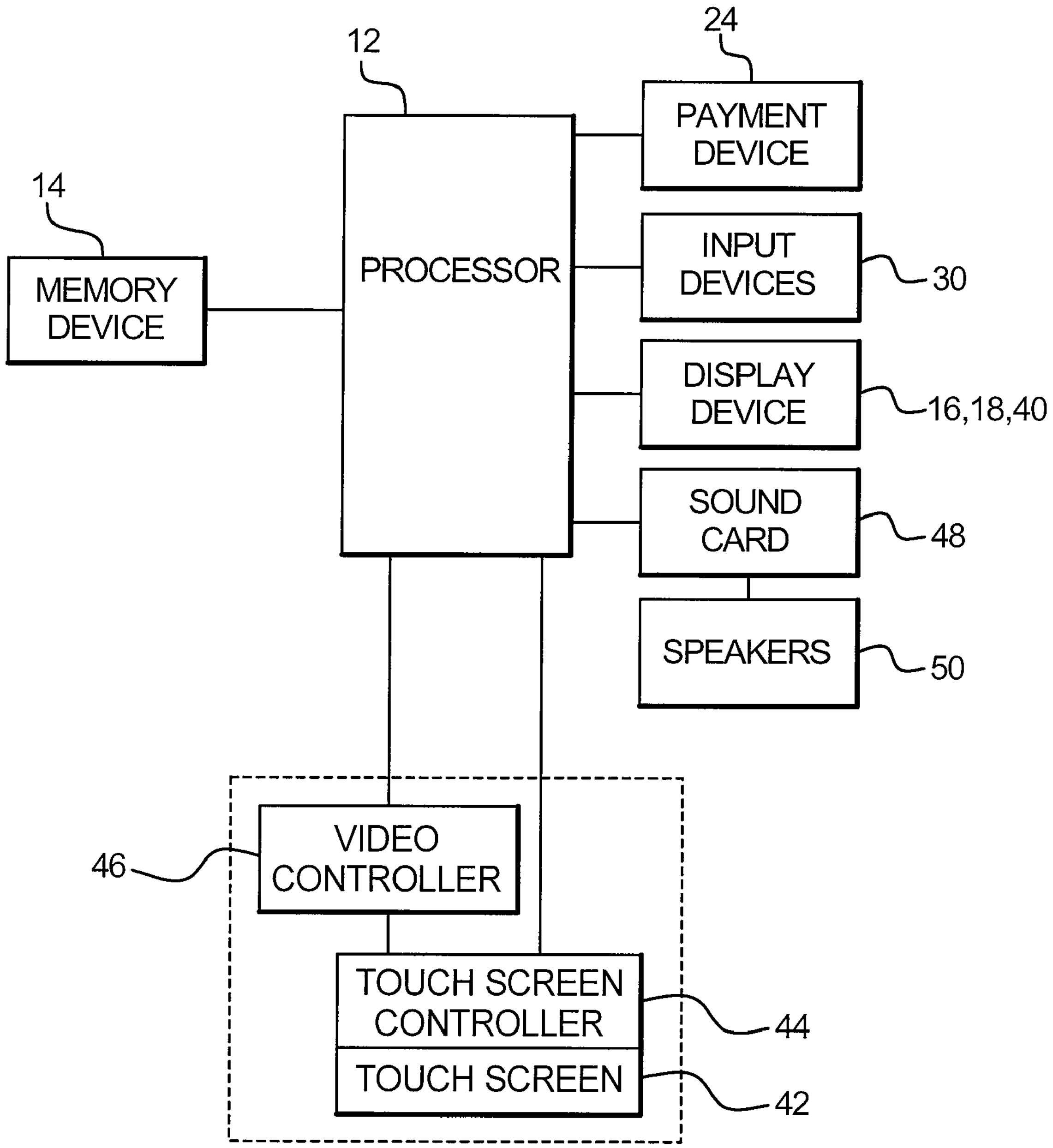
FIG. 2A is a schematic block diagram of the electronic configuration of one embodiment of a gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device -employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, a repeat the bet button, an enter button, or a spin button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player-for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
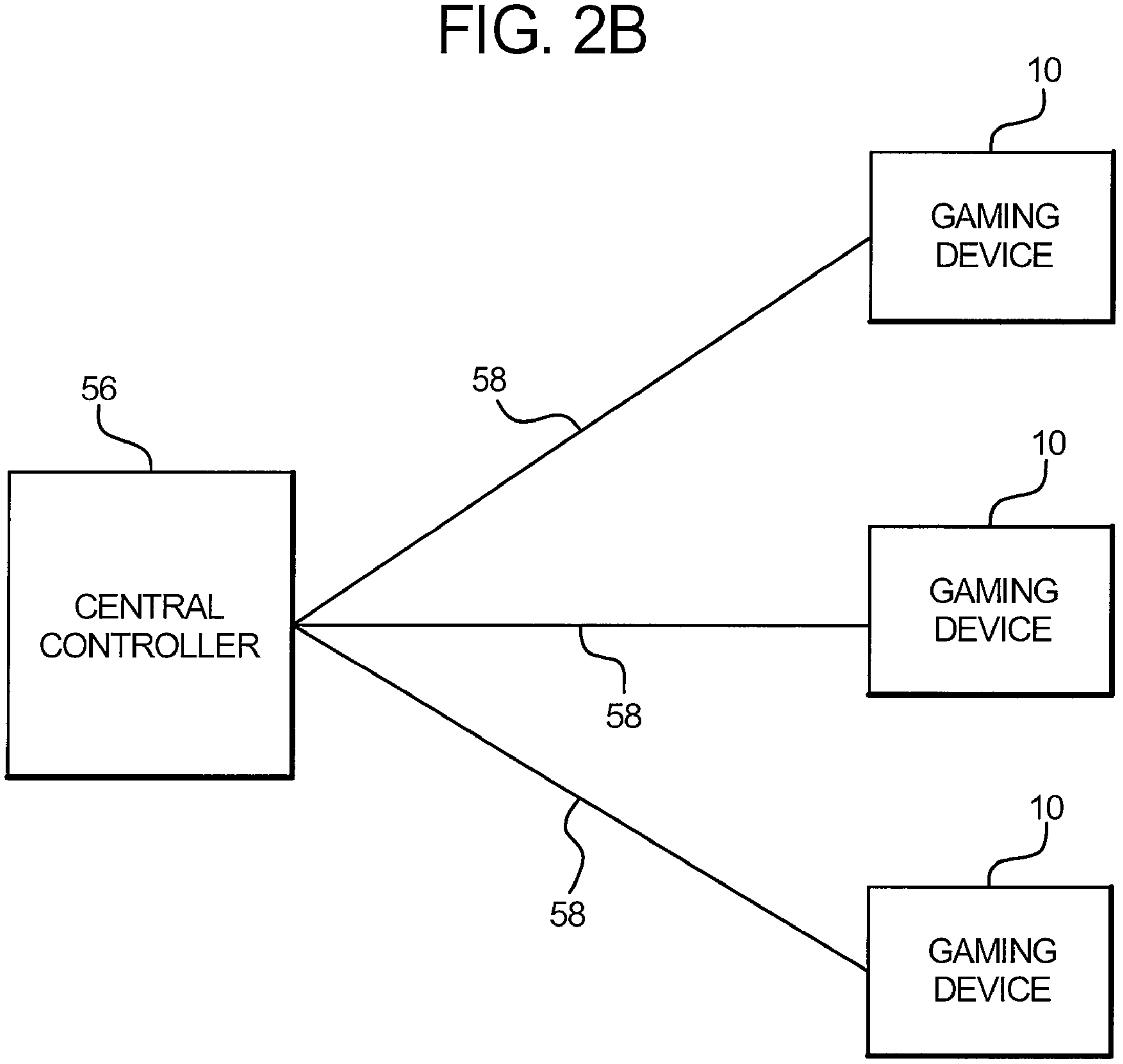
FIG. 2B is a schematic diagram of the central server in communication with a plurality of gaming machines in accordance with one embodiment of the gaming system disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered (including any replay of modifier wagers), average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will Win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

The Gaming System Implemented with a Slot Game

In one embodiment, the present disclosure is implemented with slot machines or internet slot play. As illustrated in FIGS. 1A and 1B, each slot machine (and the internet version of slot) includes one or more paylines 52. Paylines 52 may be horizontal, vertical, circular, diagonal, angled or any combination thereof. Slot machine gaming system displays a plurality of reels 54, such as three to five reels in either electromechanical form with mechanical rotating reels or in video form with simulated reels and movement. It should be appreciated that any suitable number of reels may be employed in the wagering game. It should also be appreciated that the gaming system may be implemented with a card game or any other suitable game.

Figure 3A:
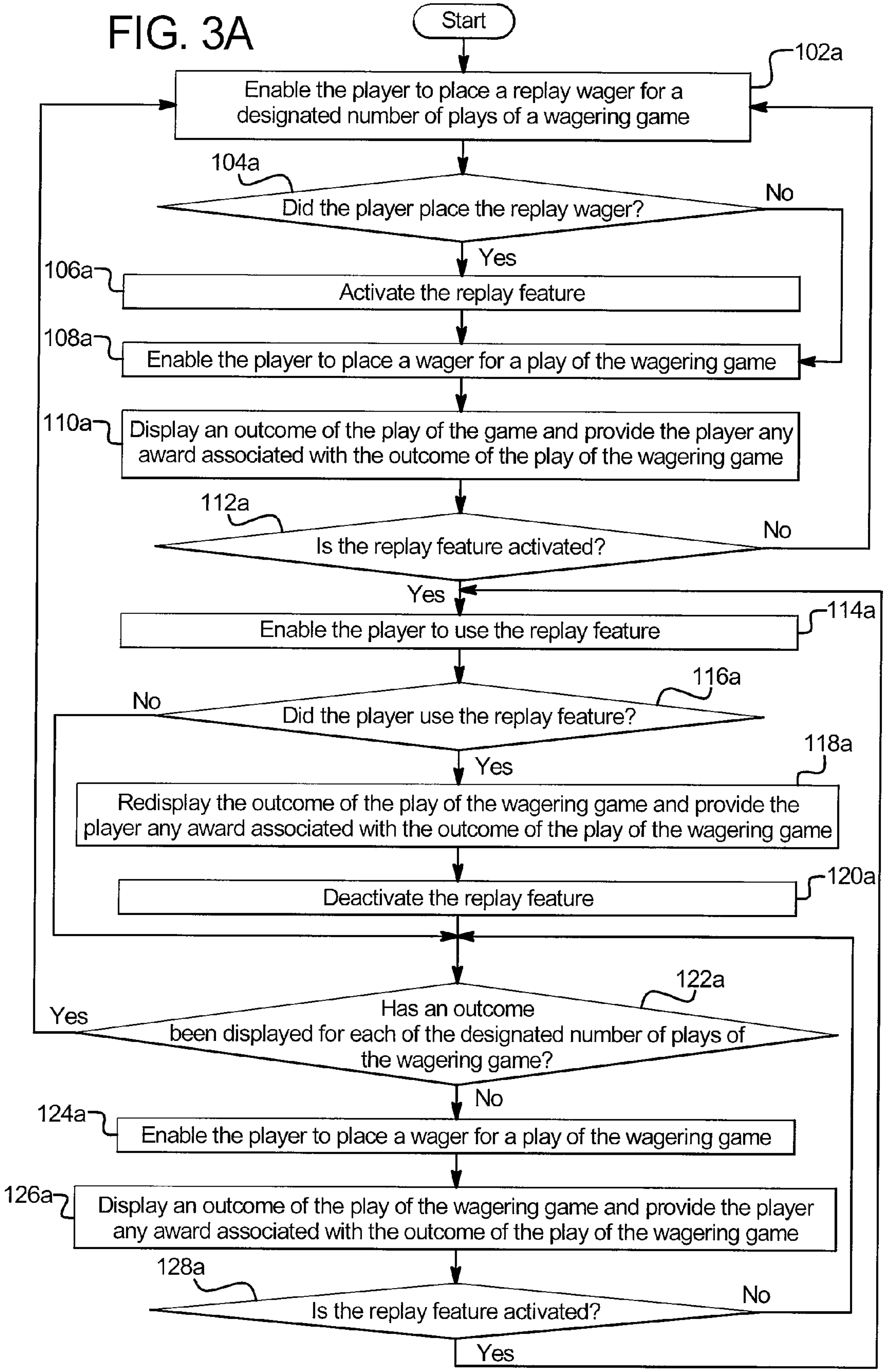
FIG. 3A is a flow chart of the operation of one embodiment of the gaming system disclosed herein.

Referring now to FIG. 3A, in one embodiment, gaming system 10 enables a player to place a replay wager as indicated in block 102*a*. The gaming system determines whether the player placed the replay wager as indicated by block 104*a*. If the player places the replay wager, the gaming system activates a replay feature as indicated by block 106*a*. If the player does not place the replay wager, the gaming system does not activate the replay feature. After determining whether the player placed the replay wager, the gaming system enables the player to place a wager for a play of the wagering game as indicated by block 108*a*. After the player places the wager for the play of the wagering game, the gaming system displays an outcome of the play of the wagering game and provides the player any award associated with the outcome of the play of the wagering game as indicated in block 110*a*.

After displaying the outcome of the play of the wagering game, the gaming system determines if the replay feature is activated as indicated by block 112*a*. As indicated by block 114*a*, if the replay feature is activated, gaming system enables the player to use the replay feature for the play of the wagering game. If the replay feature is not activated, the gaming system again enables the player to place a replay wager as indicated by block 102*a*, and the gaming system repeats the steps indicated by blocks 102*a* through 112*a*. If the replay wager is activated and the player chooses to replay the play of the wagering game, the gaming system redisplays the outcome of the play of the wagering game and provides the player with any award associated with the outcome of the play of the wagering game as indicated by block 118*a*. The gaming system then deactivates the replay feature as indicated by block 120*a*.

If an outcome has not been displayed for each of the designated number of plays of the wagering game, the gaming system enables the player to place a wager for a another one of the designated number of plays of the wagering game as indicated in block 124*a*. The gaming system displays an outcome of the play of the wagering game and provides the player with any award associated with the outcome of the play of the wagering game as indicated by block 126*a*. As indicated by block 128*a*, the gaming system then determines if the replay feature is activated. If so, the gaming system enables the player to use the replay feature for the play of the wagering game. If the replay feature is not activated, the gaming system repeats the steps indicated by block 122*a* through block 128*a* until an outcome has been displayed for each of the designated number of plays of the wagering game.

If the replay feature is activated and the gaming system determines that the player did not use the replay feature for the play of the wagering game (as indicated by block 116*a*), the gaming system determines whether an outcome has been displayed for each of the designated number of plays of the wagering game, as indicated by block 122*a*. If an outcome has been displayed for each of the designated number of plays of the wagering game, the gaming system again enables the player to place a replay wager as indicated by block 102*a*.

If the player used the replay feature for the play of the wagering game, the gaming system determines if an outcome has been displayed for each of the designated number of plays of the wagering game as indicated by diamond 122*a*. If so, the gaming system again enables the player to place a replay wager as indicated by block 102*a*. If an outcome has not been displayed for each of the designated number of plays of the wagering game, the gaming system enables the player to place a wager for one of the remaining plays of the designated number of plays of the wagering game as indicated by block 124*a*. After the player places a wager for the play of the wagering game, the gaming system displays an outcome for the play of the wagering game and provides any awards associated with the outcome of the play of the wagering game as indicated by block 126*a*. The gaming system then determines if the replay feature is activated. If so, the gaming system enables the player to use the replay feature for the play of the wagering game. If the replay feature is not activated, the gaming system repeats the steps indicated by block 122*a* through block 128*a* until an outcome has been displayed for each of the designated number of plays of the wagering game. It should be appreciated that since the player used the replay, the gaming system does not enable the player to use the replay for any of the remaining plays of the designated number of plays of the wagering game. After an outcome has been displayed for each of the designated number of plays of the wagering game, the gaming system again enables the player to place a replay wager as indicated by block 102*a*.

It should be appreciated that in alternative embodiments, once the player uses the replay feature, the gaming system enables the player to place another replay wager to activate another replay feature before the gaming system displays an outcome of another play of the wagering game. That is, after the player uses the replay feature for one of the designated number of plays of the wagering game, the gaming system enables the player to place another replay wager to activate another replay feature regardless of whether the gaming system has displayed an outcome for each of the number plays of the wagering game.

Figure 3B:
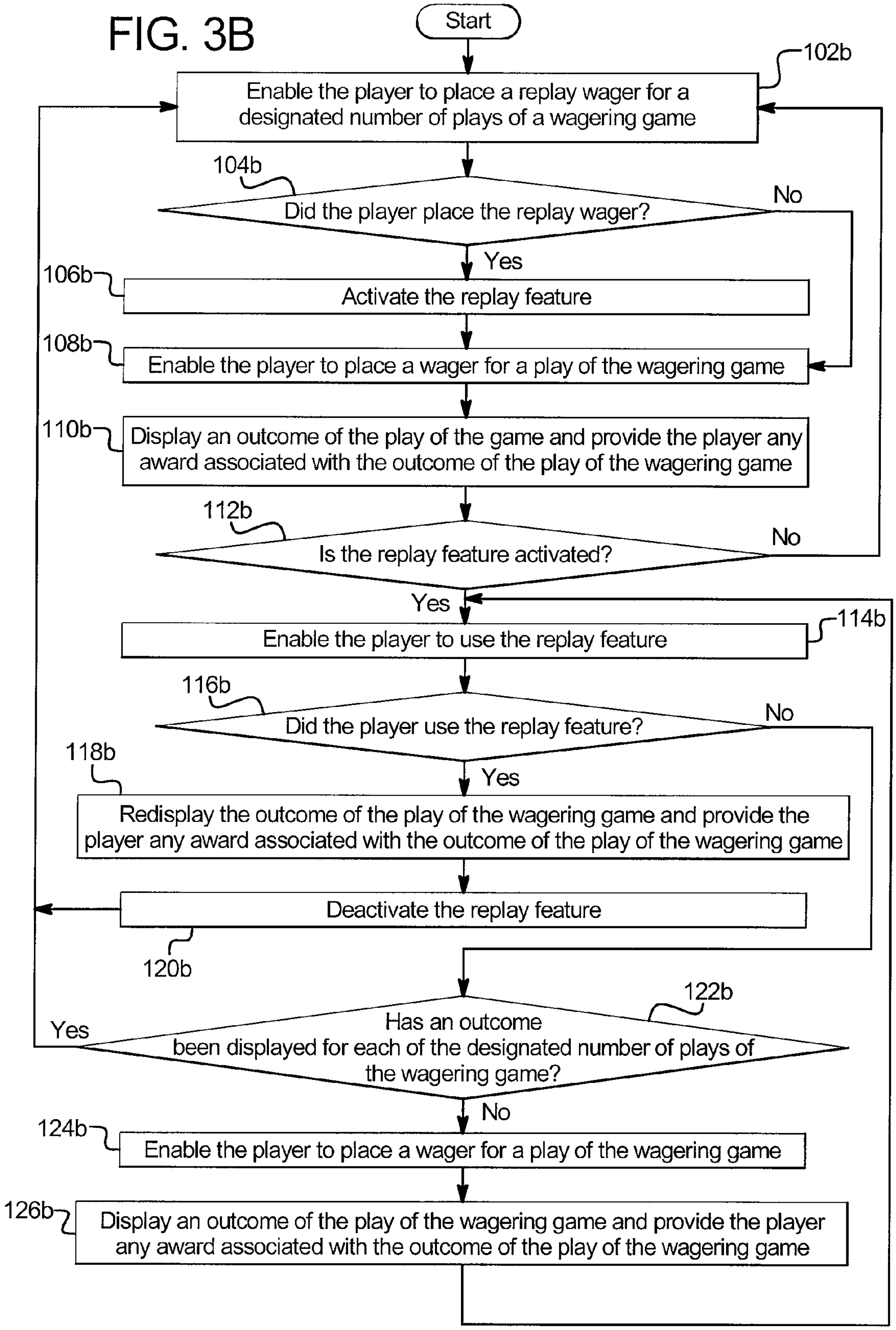
FIG. 3B is a flow chart of the operation of another embodiment of the gaming system disclosed herein.

Referring now to FIG. 3B, for example, in an alternative embodiment, after displaying the outcome of the play of the wagering game, the gaming system determines if the replay feature is activated as indicated by block 112*b*. If the replay feature is not activated, the gaming system again enables the player to place a replay wager as indicated by block 102*b*, and the gaming system repeats the steps indicated by blocks 102*b* through 112*b*. If the replay wager is activated, the gaming system enables the player to use the replay feature. If the player chooses to replay the play of the wagering game, the gaming system redisplays the outcome of the play of the wagering game and provides the player with any award associated with the outcome of the play of the wagering game as indicated by block 118*b*. The gaming system then deactivates the replay feature as indicated by block 120*b*. However, after the player uses the replay feature for the play of the wagering game, the gaming system again enables the player to place a replay wager as indicated by block 102*b*, regardless of whether an outcome has been displayed for each of the designated number of plays of the wagering game. Therefore, the gaming system of the example embodiment of FIG. 3B does not require the player to play the remaining plays of the designated number of plays of the wagering game before the gaming system enables the player to place another replay wager.

Figure 4:
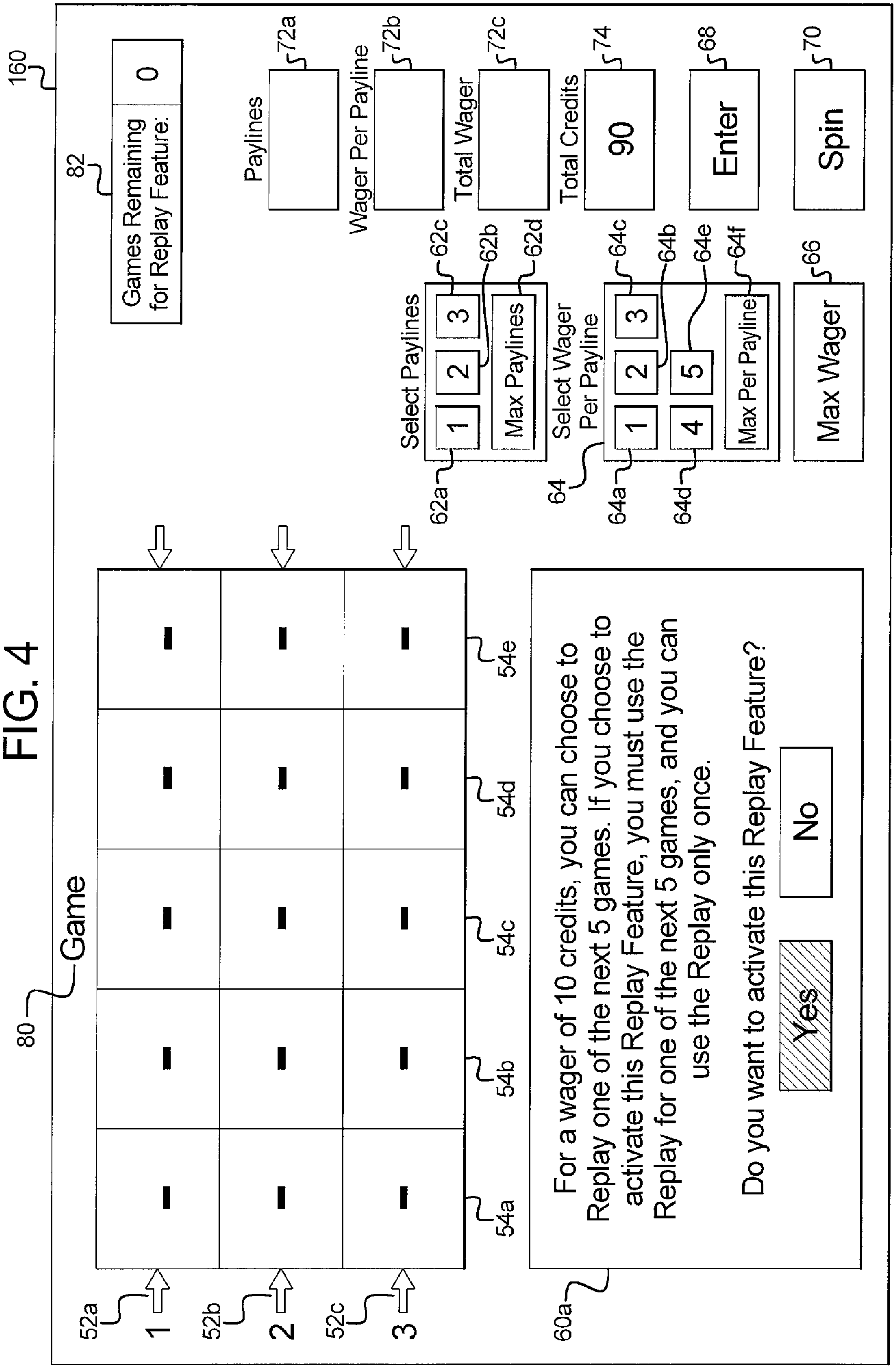
FIG. 4 is an enlarged view of one of the displays of an example of the embodiment of FIG. 3A, and illustrates an example of the operation of the embodiment of FIG. 3A.

One example of the operation of the embodiment of FIG. 3A is illustrated in FIG. 4 through FIG. 16. In this example embodiment, the player funds the gaming machine with 100 credits. Total credit meter 74 indicates that the player has 100 total credits. Referring now to FIG. 4, the gaming system enables the player to place a replay wager to activate a replay feature. An audio, visual, or audiovisual message 60*a* informs the player that the player can activate the replay feature if the player places the replay wager. In this illustrated example, the player uses button 88 of touch screen 160 to place a replay wager of ten credits to activate the replay feature for five plays of the wagering game. After the player places the replay wager, the gaming system debits the replay wager amount from the player's total credits, leaving the player with ninety total credits remaining.

Figure 5:
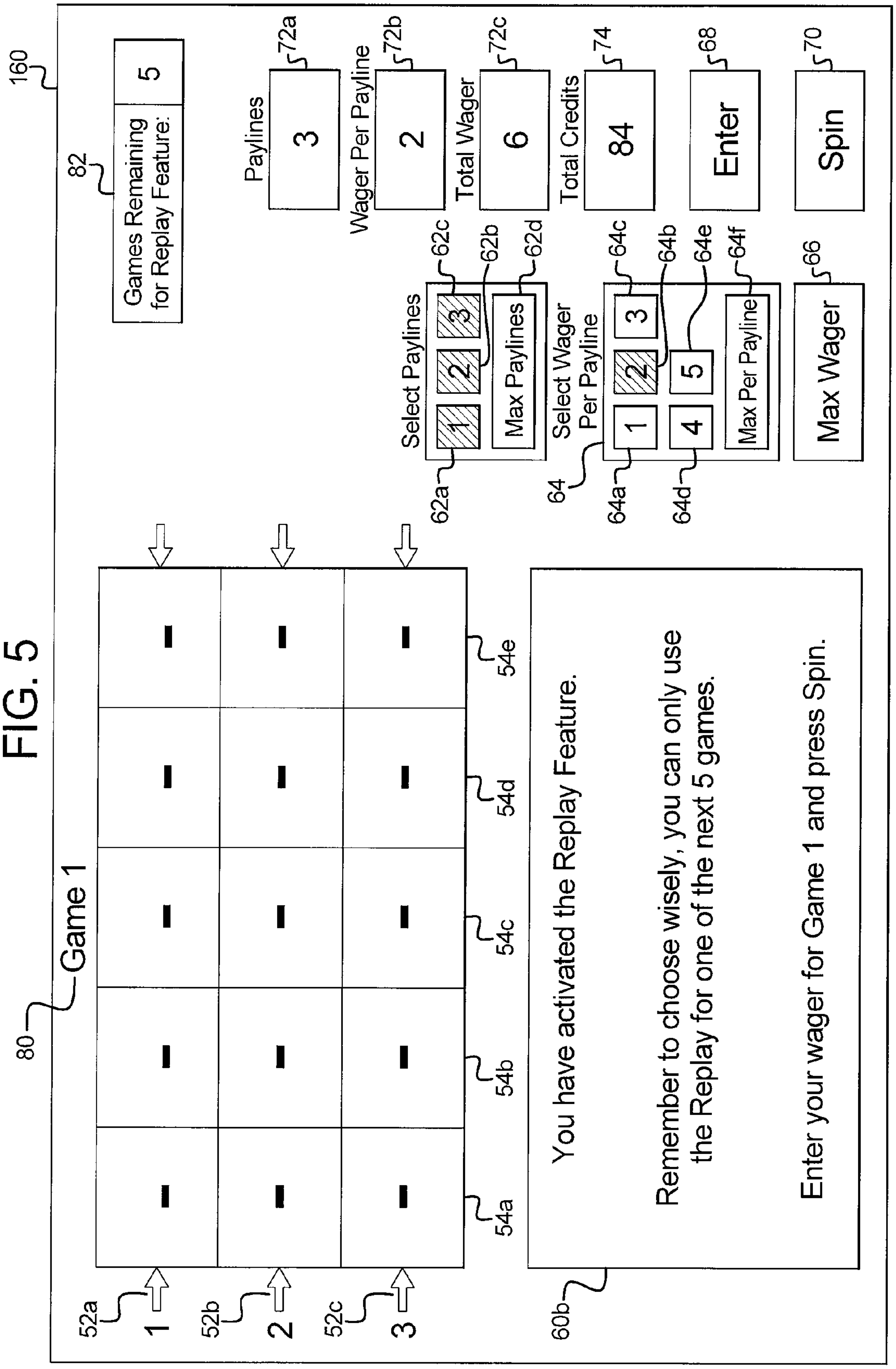
FIG. 5 is an enlarged view of the display of the example of FIG. 4, and illustrates the wager entry for the first play of the wagering game.

As illustrated by FIG. 5, message 60*b* informs the player that the replay feature is activated, and reminds the player that the replay feature can be used for only one of the five plays of the wagering game. Game number display 80 displays the number of the play of the wagering game (i.e., Game 1), and games remaining display 82 displays the number of plays remaining (i.e., five plays) for which the player may use the replay feature if the replay feature is activated.

Message 60*b* prompts the player to place a wager for the first play of the wagering game. Wager inputs 62, 64, and 66 include select paylines inputs 62*a* to 62*d*, which enable the player to change the paylines 52 wagered, and select wager per payline inputs 64*a* to 64*f*, which enable the player to input the wager amount for the paylines wagered. In the illustrated example, the player selects paylines one, two, and three by using select paylines inputs 62*a*, 62*b*, and 62*c*. The player wagers two credits per payline by pressing select wager per payline input 64*b*. Wager displays 72*a*, 72*b*, and 72*c* indicate the number of paylines wagered (i.e., three paylines), the wager per payline (i.e., two credits per payline) and the total wager (i.e., six credits) for the first play of the wagering game, respectively. Total credit meter 74 indicates that the player has 84 total credits remaining after placing the replay wager (i.e., ten credits) and the wager for the play of the wagering game (i.e., six credits). It should be appreciated that the gaming system can limit the maximum or minimum amount the player may wager on any play of the wagering game. The gaming system may determine the maximum and/or minimum amounts based on the amount of the replay wager input by the player, the probability of achieving awards for the plays of the wagering game, the average magnitude and/or range of awards achievable for the plays of the wagering game, and/or based on any other suitable criteria. After selecting the number of paylines 52 wagered and the wager per payline, the player uses spin input 70 to set the wager and start the first play of the wagering game.

Figure 6:
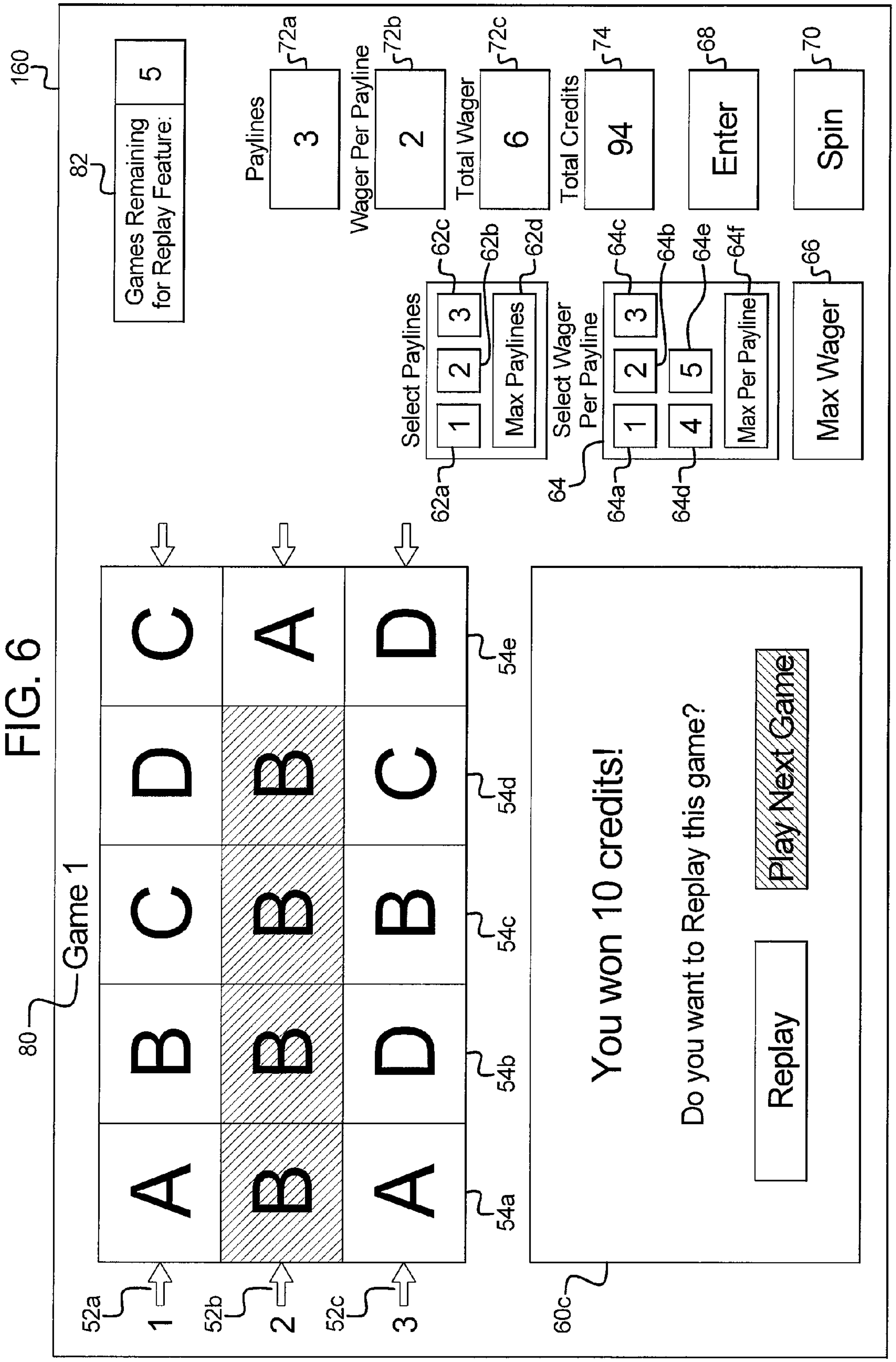
FIG. 6 is an enlarged view of the display of the example of FIG. 4, and illustrates the outcome for the first play of the wagering game.

As illustrated in FIG. 6, the gaming system randomly generates and displays an outcome of the play of the wagering game. The gaming system provides an award associated with one or more winning symbol combinations indicated on one of the paylines 52. In this illustrated example, the combination of four "B" symbols on payline two 52*b* is a winning symbol combination. The gaming system provides the player the award of ten credits associated with the winning symbol combination. Accordingly, the gaming system displays message 60*c* to indicate the award to the player, and the number of credits displayed by total credit meter 74 increases by ten credits to ninety-four credits.

Continuing with FIG. 6, the gaming system provides the player an opportunity to either use the replay feature for the first play of the wagering game, or to play the next play of the wagering game. In this illustrated example, if the player uses the replay feature for the first play of the wagering game, the gaming system debits the previously placed wager (e.g., six credits) from the player's total credits. The gaming system then redisplays the play of the wagering game, and provides the player the award associated with the outcome of the play of the wagering game. In this example, however, the player chooses to play the next play of the wagering game without replaying the first play of the wagering game.

Figure 7:
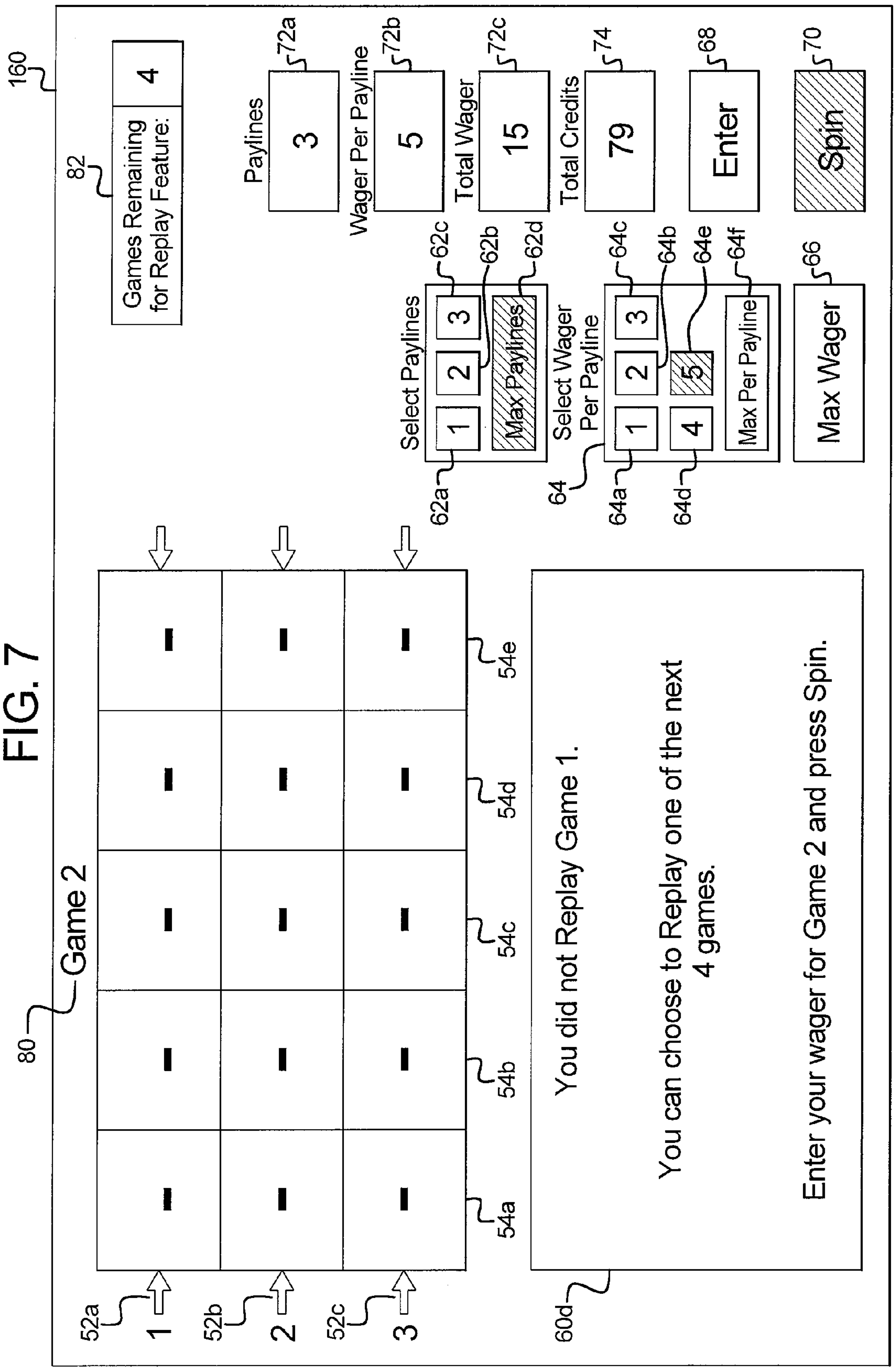
FIG. 7 is an enlarged view of the display of the example of FIG. 4, and illustrates the wager entry for the second play of the wagering game.

Referring now to FIG. 7, message 60*d* informs the player that the replay feature may be used to replay one of the next four plays of the wagering game, and prompts the player to place a wager for Game 2. Games remaining display 82 indicates that there are four remaining games for which the player may use the replay feature. The player again selects three paylines using select paylines input 62*d*, and selects a wager of five credits per payline using select wager per payline input 64*e* for a total wager of fifteen credits as indicated by total wager display 72*c*. After selecting the wager, the player uses spin input 70 to set the wager and play the second play of the wagering game.

Figure 8:
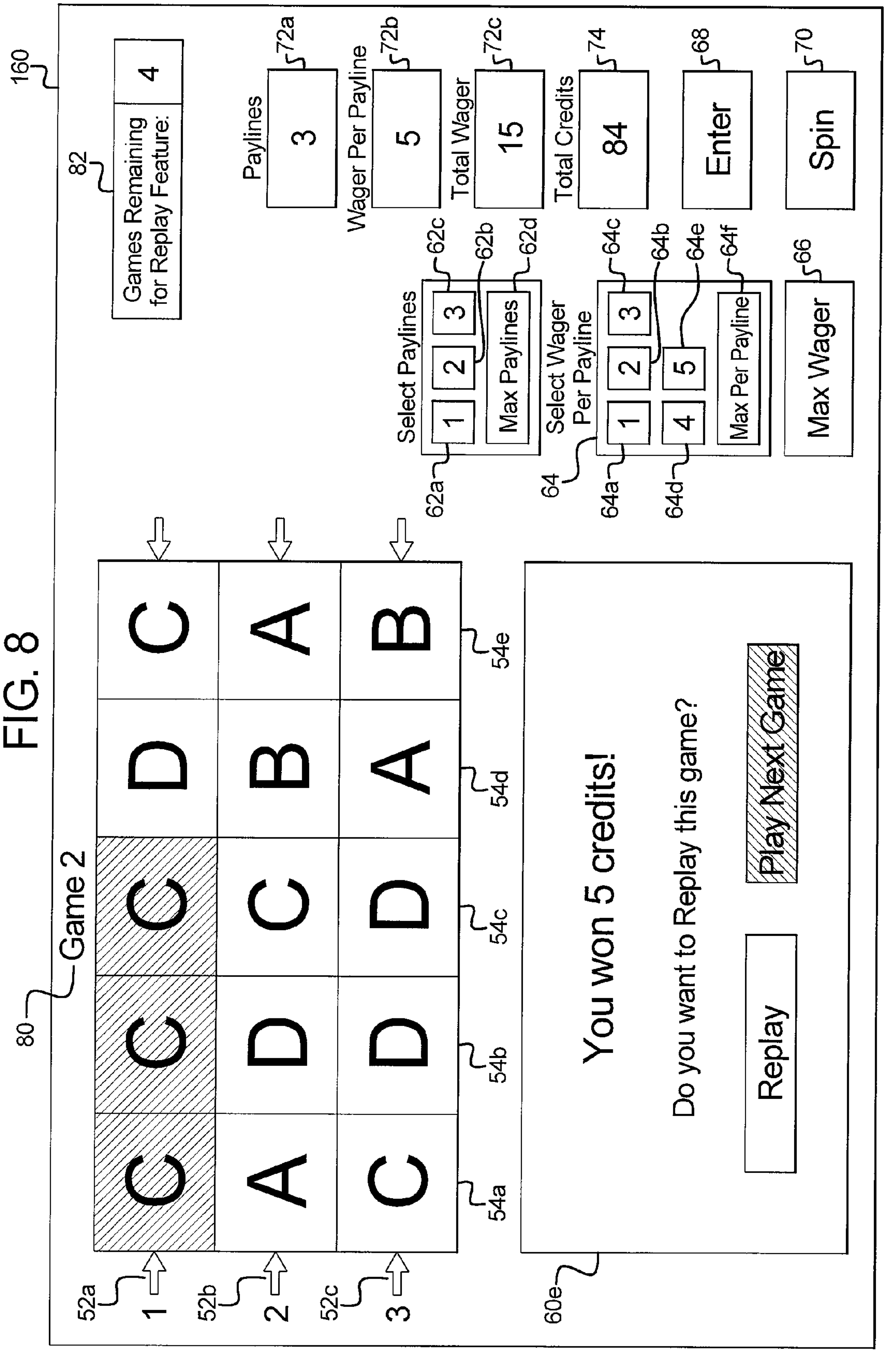
FIG. 8 is an enlarged view of the display of the example of FIG. 4, and illustrates the outcome for the second play of the wagering game.

As shown in FIG. 8, the gaming system generates and displays the outcome for game two. The combination of three "C" symbols displayed on payline one 52*a* results in an award of five credits for the second play of the wagering game, as indicated by message 60*e*. The gaming system enables the player to replay the play of the wagering game. Since the player wagered fifteen credits, but only won five credits, the player lost a total of ten credits for this play of the wagering game. If the player uses the replay feature for this play of the wagering game, the player will lose an additional ten credits. In this illustrated example, the player again chooses to play the next play of the wagering game.

Figure 9:
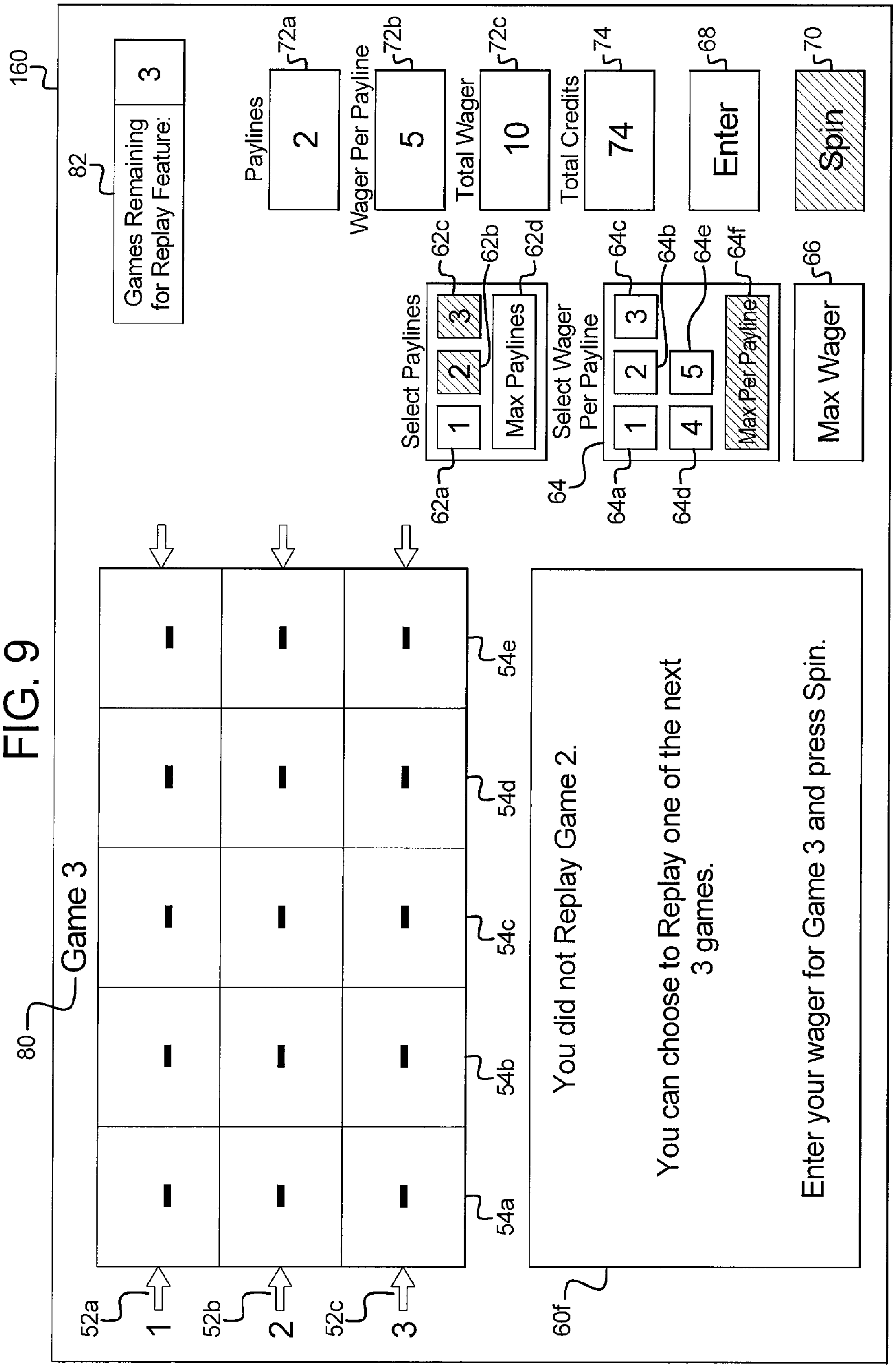
FIG. 9 is an enlarged view of the display of the example of FIG. 4, and illustrates the wager entry for the third play of the wagering game.
Figure 10:
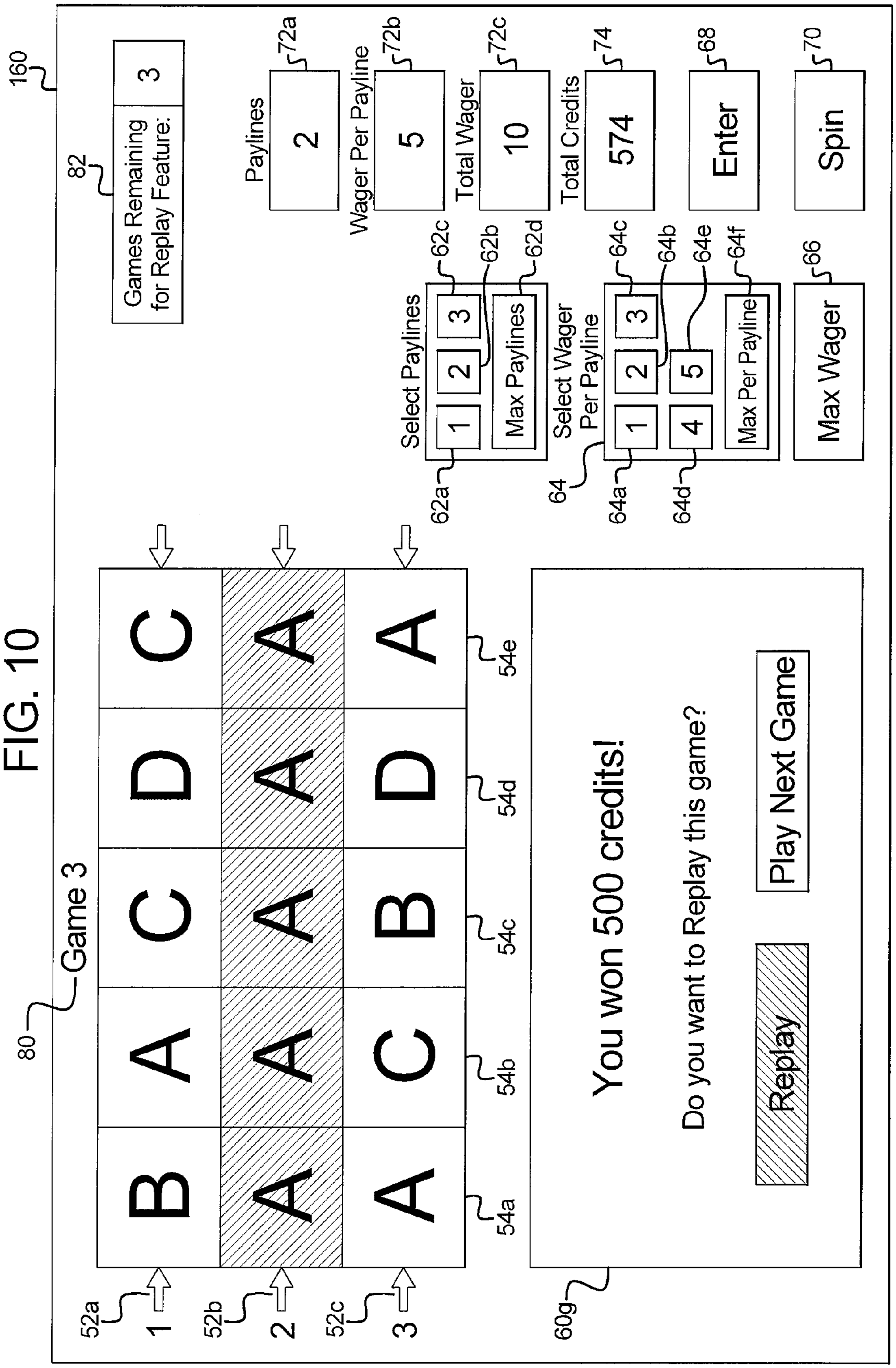
FIG. 10 is an enlarged view of the display of the example of FIG. 4, and illustrates the outcome for the third play of the wagering game.

As illustrated in FIG. 9, the player wagers five credits per payline on paylines two and three for a total wager of ten credits for the third play of the wagering game. Referring to FIG. 10, the gaming system generates and displays the outcome for Game 3. The combination of five "A" symbols displayed on payline two 52*b* results in an award of 500 credits for the third play of the wagering game, as indicated by message 60*g*. The gaming system provides the player with an opportunity to replay the third play of the wagering game. The player wagered ten credits and won 500 credits for a net award of 490 credits for this play of the wagering game. If the player uses the replay feature for this play of the wagering game, the player will win an additional 490 credits. It should be appreciated that if the player uses the replay for one of the plays of the wagering game, instead of deducting an additional amount equal to the player's wager for the play of the wagering game from the player's total credits, various embodiments of the gaming system do not deduct an additional wager for the replay of the play of the wagering game. For example, a player activates a replay feature and wagers ten credits for a play of the wagering game. The play of the wagering game results in an award of 500 credits. If the player chooses to replay the play of the wagering game, the gaming system provides the player with an additional 500 credits without deducting an additional ten credits for the replay of the play of the wagering game.

Figure 11:
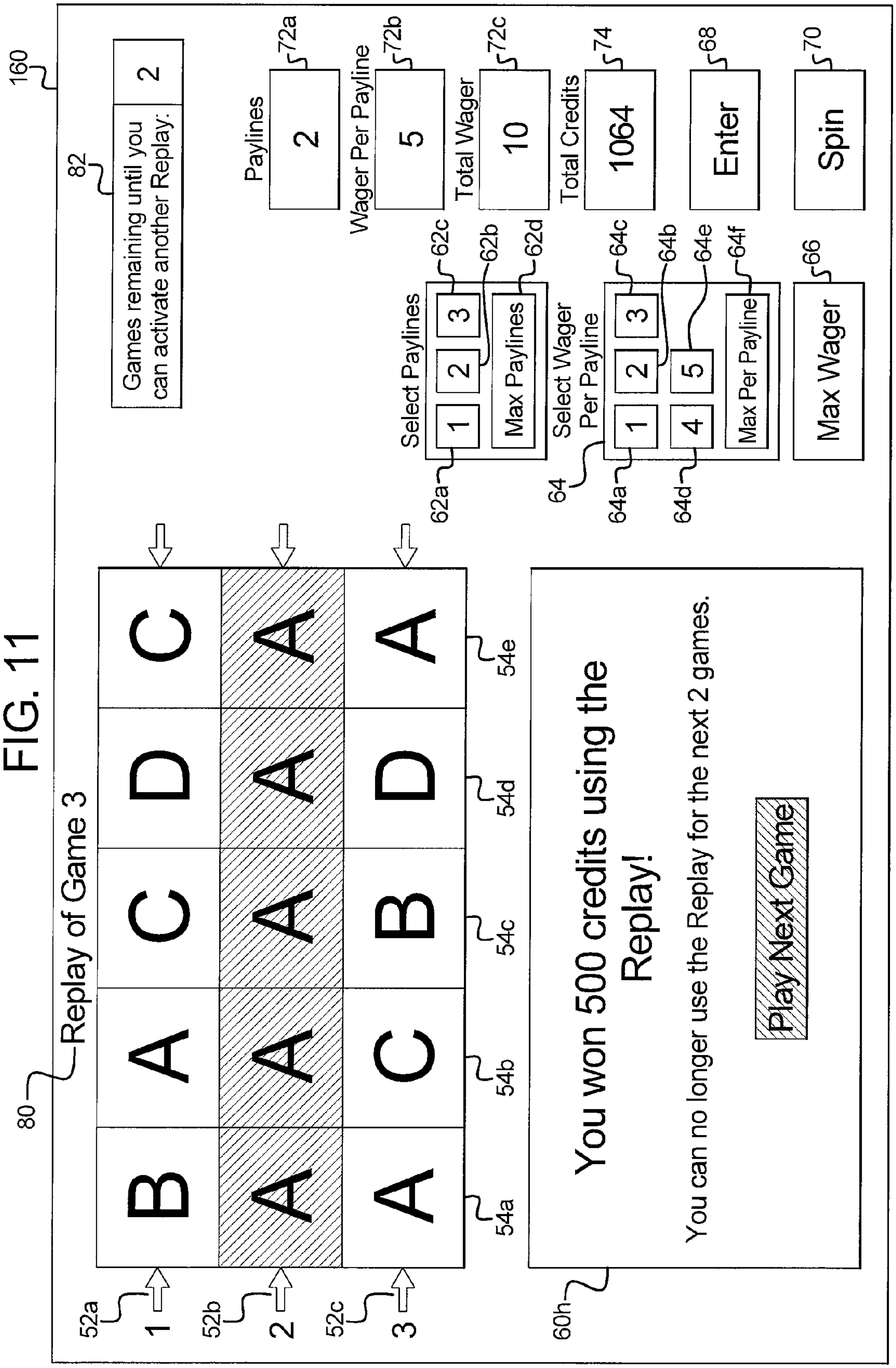
FIG. 11 is an enlarged view of the display of the example of FIG. 4, and illustrates a replay of the third play of the wagering game.

In this illustrated example, the player chooses to replay the third play of the wagering game. As a result, the gaming system debits the player's previously placed wager of ten credits from the player's total credits. The gaming system spins the reels and redisplays the outcome of game three. Referring to FIG. 11, game number display 80 indicates that the gaming system is displaying the replay of Game 3. After the gaming system displays the outcome of the replay of Game 3, message 60*h* indicates a replay award of 500 credits for the replay of Game 3. Message 60*h* informs the player that the player may not replay the remaining two plays of the wagering game, and games remaining display 82 displays the number of games remaining until the gaming system will provide the player with an opportunity to activate another replay feature.

Figure 12:
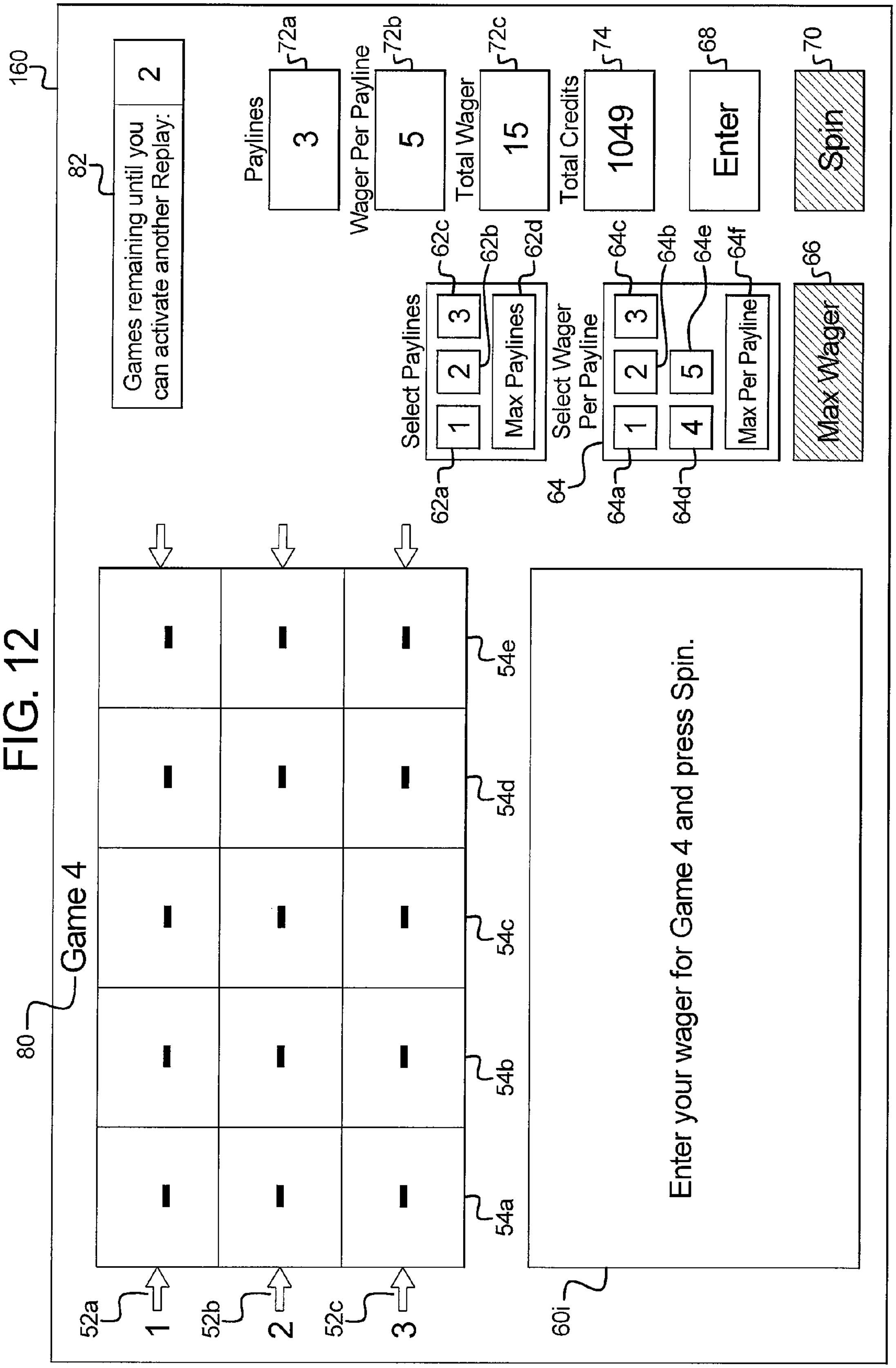
FIG. 12 is an enlarged view of the display of the example of FIG. 4, and illustrates the wager entry for the fourth play of the wagering game.

As illustrated in FIG. 12, after displaying the replay of Game 3, message 60*i* prompts the player to place a wager for the fourth play of the wagering game. The player places the wager using max wager input 66, which causes the gaming system to select the maximum number of paylines (e.g., three) as indicated by paylines display 72*a*, and wager the maximum wager per payline (e.g., five credits per payline) as indicated by wager per payline display 72*b*, for a total wager of fifteen credits for the play of the wagering game.

Figure 13:
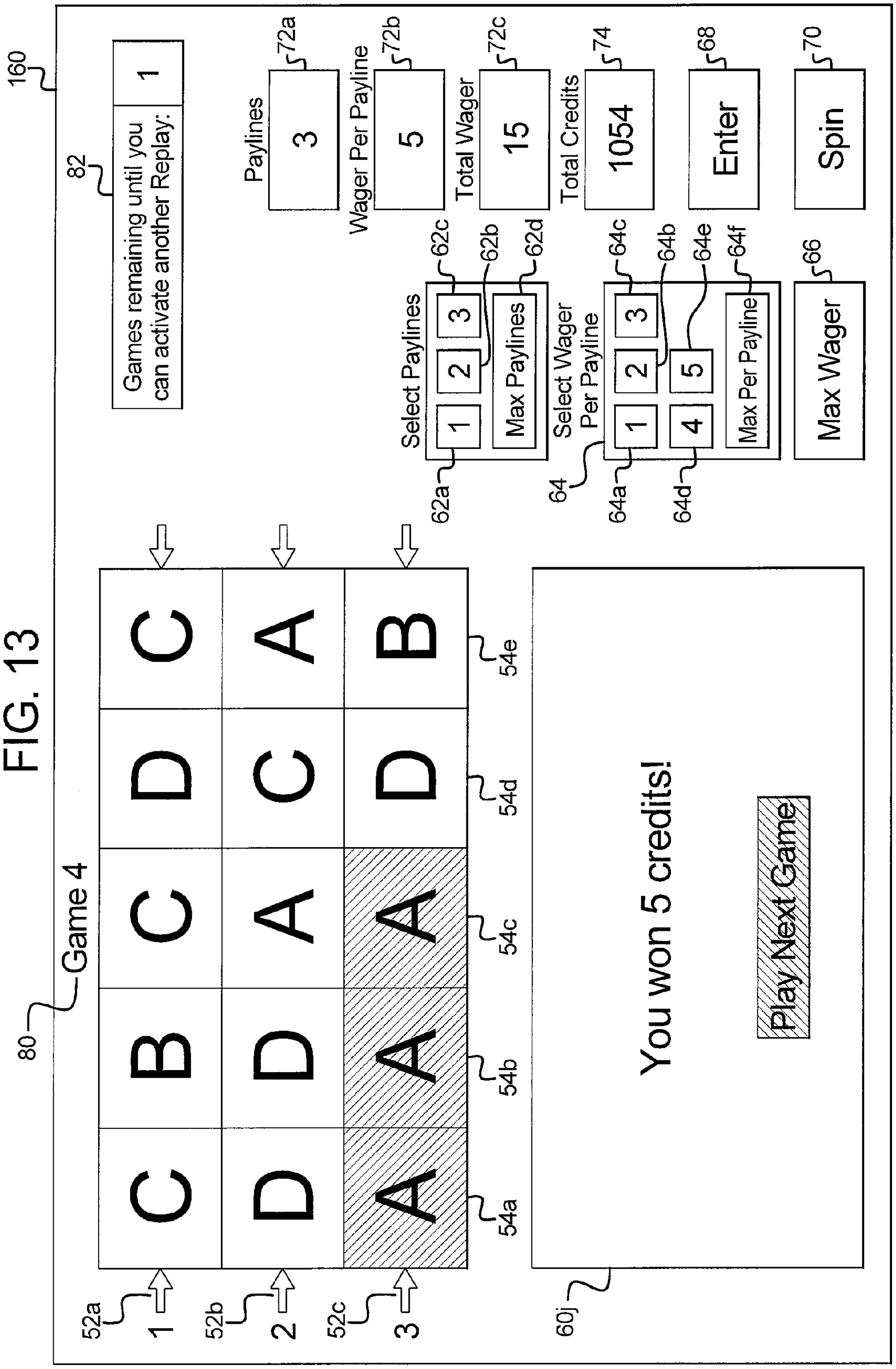
FIG. 13 is an enlarged view of the display of the example of FIG. 4, and illustrates the outcome for the fourth play of the wagering game.

Referring to FIG. 13, the gaming system generates and displays the outcome of Game 4, and provides the player the award of five credits associated with the outcome of the fourth play of the wagering game. Message 60*i* displays the award amount, and prompts the player to play the next play of the wagering game. Since the player cannot use the replay for the remaining plays of the wagering game, the gaming system does not provide the player with an opportunity to use the replay feature for Game 4.

Figure 14:
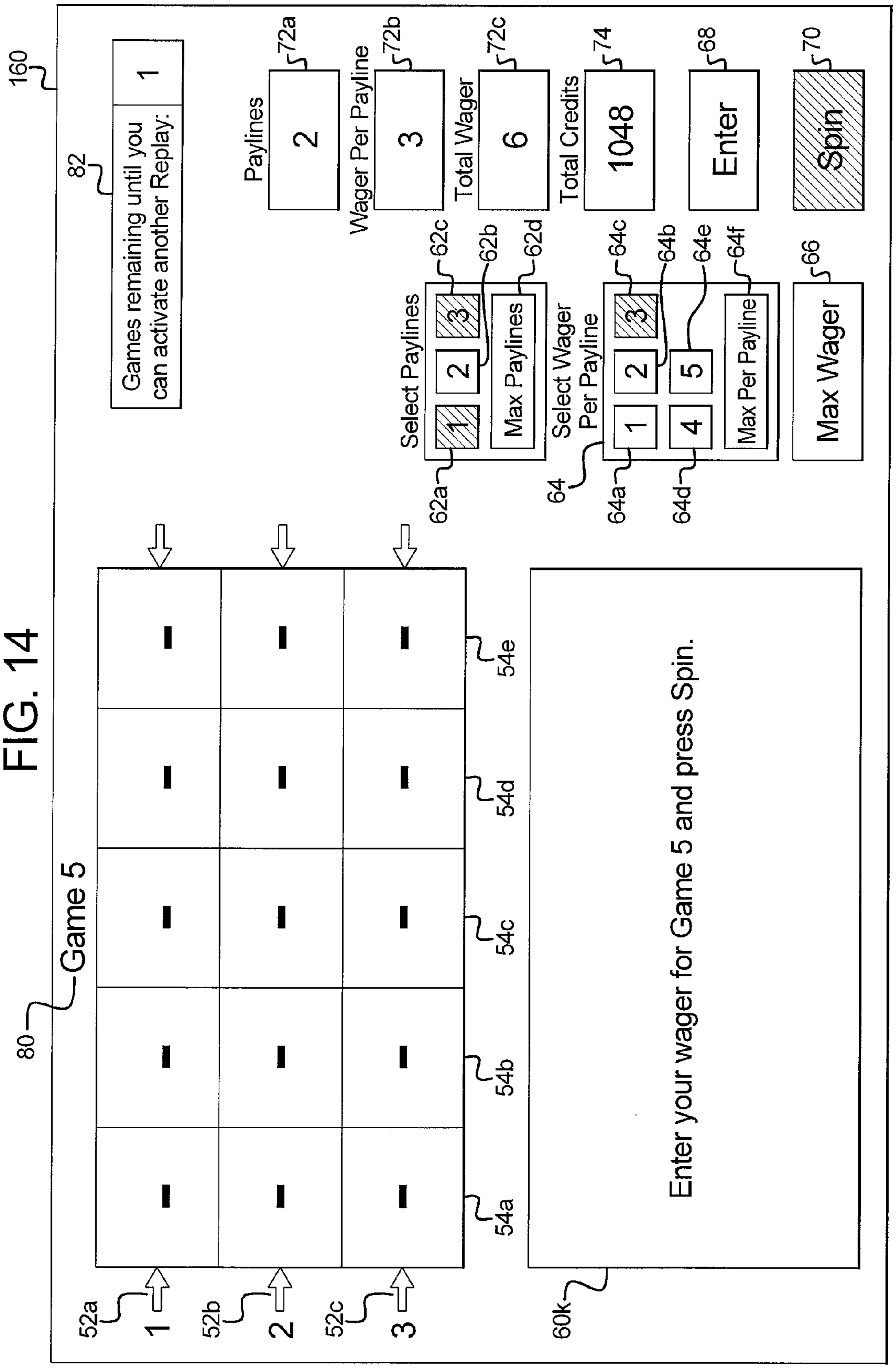
FIG. 14 is an enlarged view of the display of the example of FIG. 4, and illustrates the wager entry for the fifth play of the wagering game.
Figure 15:
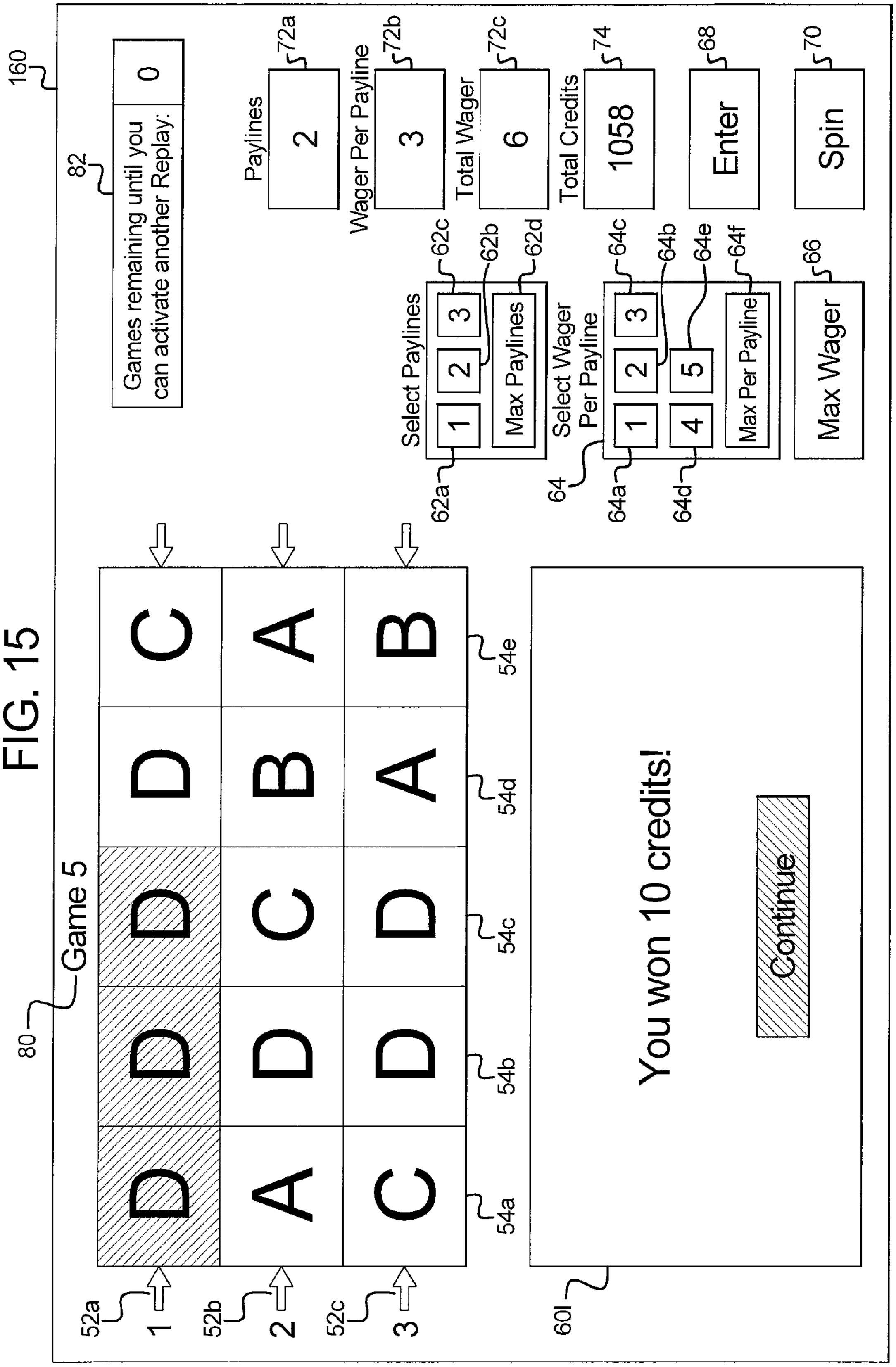
FIG. 15 is an enlarged view of the display of the example of FIG. 4, and illustrates the outcome for the fifth play of the wagering game.
Figure 16:
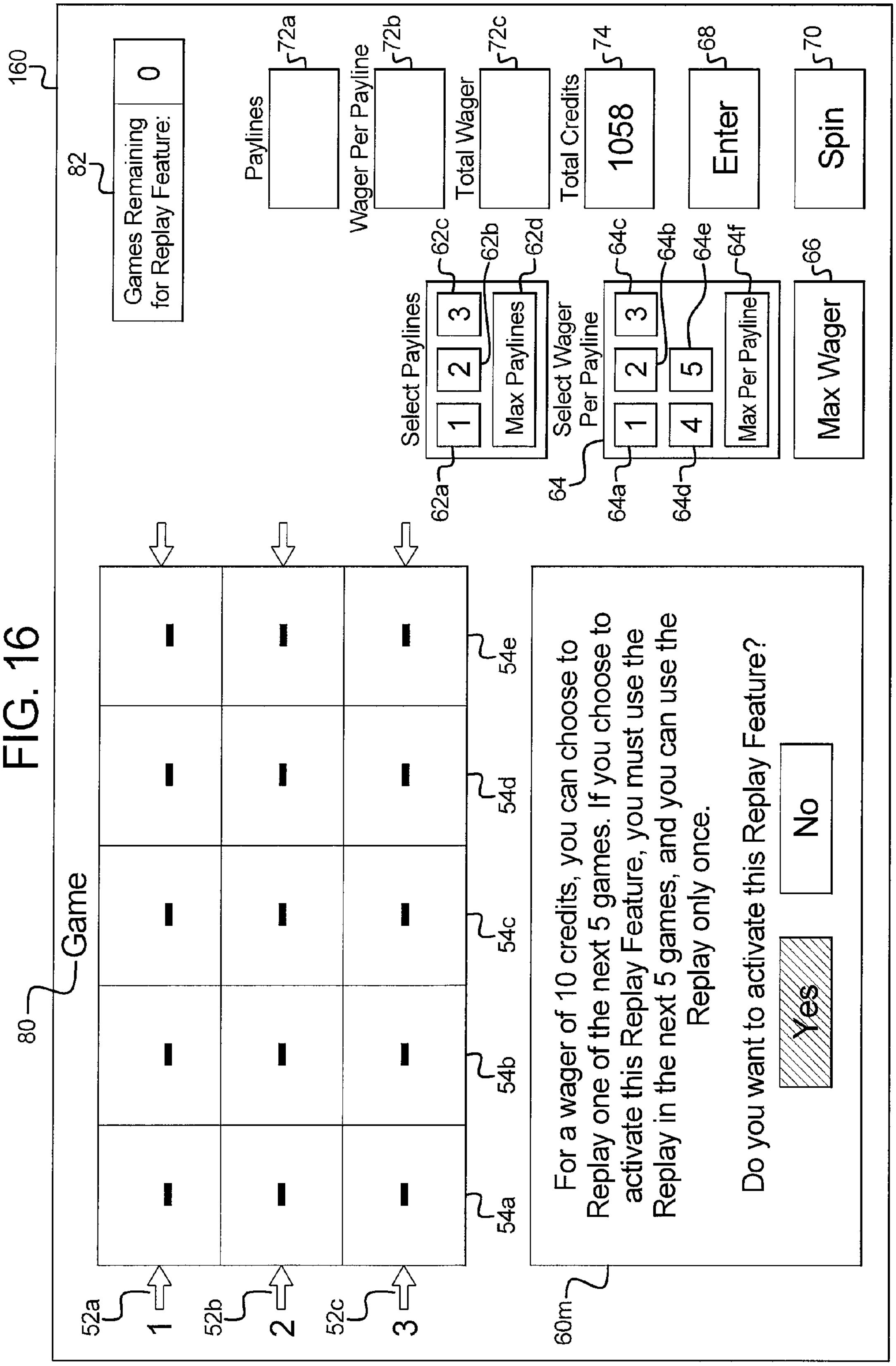
FIG. 16 is an enlarged view of the display of the example of FIG. 4, and illustrates the activation of an additional replay feature for an additional five plays of the wagering game.

FIGS. 14 and 15 illustrate the fifth play of the wagering game. The player wagers three credits per payline on payline one 52*a* and payline three 52*c*. The gaming system generates and displays the outcome of Game 5, and provides the player with an award of ten credits associated with the combination of three "D" symbols on payline one 52*a*. As illustrated in FIG. 16, after the fifth play of the wagering game, the gaming system enables the player to place another replay wager of ten credits to activate another replay feature for the next five plays of the wagering game.

In different embodiments, if the player places the replay wager, the gaming system activates the replay feature for a limited or unlimited number of plays of the wagering game. In another embodiment, the replay wager activates the replay feature for a randomly determined number of plays of the wagering game. The gaming system may display the randomly determined number of plays of the wagering game to the player before or after the player places the replay wager. In another embodiment, the gaming system enables the player to place a plurality of replay wagers to activate a plurality of replay features.

In another embodiment, the player may select any desired replay wager amount, and/or select from a plurality of predetermined replay wager amounts. Alternatively, the gaming system may randomly determine the replay wager amount. In one embodiment, the player uses wager inputs 62, 64, and 66 to enter the desired replay wager amount. In another embodiment, the gaming system displays a plurality of replay wager amounts, and the player may select the replay wager amount from the plurality of displayed replay wager amounts by using wager inputs 62, 64, and 66 and/or touch screen 160. Alternatively, the player may select and place the replay wager via any suitable input system.

It should be appreciated that the gaming system may require the player to enter a separate input to set the replay wager amount after selecting the replay wager amount. For example, if the player selects a replay wager amount using wager inputs 62, 64, and 66, the gaming system may require the player to press enter input 68 to set the replay wager amount. Alternatively, the gaming system may automatically set the replay wager amount after a certain amount of time after the player selects the replay wager amount. The gaming system may also set the replay wager upon the player's selection of one of a plurality of predetermined replay wager amounts.

In one embodiment, the wager entry may be configured such that the player uses select paylines inputs 62 to select the desired number of paylines 52, then uses enter input 68 to enter the selected number of paylines and/or uses the select wager per payline inputs 64 to select the desired number of paylines and then uses enter input 68 to enter the selected wager per payline. Alternatively, the player may use enter input 68 once to enter or set any changes to the number of paylines wagered or wager per payline (or to use the previously wagered number of paylines and/or wager per payline without changes).

In one embodiment, select paylines inputs 62 and select wager per payline inputs 64 enable the player to change the number of paylines wagered and wager per payline, respectively. In one embodiment, select paylines inputs 62 are operable to enable the player to wager consecutive paylines (e.g., payline one 52*a* and payline two 52*b*) or wager non-consecutive paylines (e.g., payline one 52*a* and payline three 52*c*). In one embodiment, select wager per payline inputs 64 are operable to enable the player to: (i) wager a same amount on each payline (e.g., three credits on payline one 52*a* and payline two 52*b*); or (ii) wager different amounts on different paylines (e.g., two credits on payline one 52*a* and three credits on payline two 52*b*).

In one embodiment, after the player selects the number of paylines wagered and the wager per payline, the player uses spin input 70 to set the wager and start the first play of the wagering game. Alternatively, the gaming system sets the replay wager amount automatically after a certain period of time after the player selects the replay wager, or the gaming system sets the replay wager upon the player's selection of one of a plurality of predetermined replay wagers. In one embodiment, the player's selection of the maximum paylines via max paylines input 62*d*, maximum wager per payline via max wager per payline input 64*f*, and/or maximum wager via max wager input 66 sets the wager without selection of enter input 68 or spin input 70. In another embodiment, the player sets the wager by selecting maximum paylines via max paylines input 62*d*, maximum wager per payline via max wager per paylines input 64*f*, and/or maximum wager via max wager input 66 in combination with using enter input 68 and/or spin input 70.

In one embodiment, after the player uses the replay feature, the gaming system does not debit the previously placed wager from the player's total credits and/or redisplay all or part of the previous play of the wagering game. For example, if the player uses the replay feature, the gaming system may provide the player with the award associated with the outcome of the play of the wagering game without redisplaying the play of the wagering game, and/or without debiting the previously placed wager from the player's total credits.

In one embodiment, after the player uses the replay, the player may decide not to play any remaining plays of the designated number of plays of the wagering game (i.e., the player may cash out without playing the remaining plays of the wagering game). In another embodiment, the player must place a wager for all of the plays of the wagering game before playing any of the plays of the wagering game. In this embodiment, since the player has already purchased (i.e., wagered on) all of the plays of the group of plays of the wagering game (including the plays of the wagering game remaining after the player uses the replay), it would not be advantageous for the player to cash out without playing the remaining plays of the wagering game. Regardless, the gaming system may be configured to enable the player to cash out without playing the remaining plays of the wagering game. In one embodiment, the gaming system is configured to inform the player that the wagers placed for the remaining plays will be forfeited if the player cashes out, and the gaming system provides the player an opportunity to play the remaining plays of the wagering game. In an alternative embodiment, the gaming system refunds the player's wager for the remaining plays of the wagering game if the player desires to cash out. In another embodiment, the gaming system immediately provides the player any awards associated with the remaining plays of the wagering game when the player cashes out. In this embodiment, the gaming system may or may not display the remaining plays of the wagering game.

In one embodiment, after the player uses the replay, the gaming system requires the player to play any remaining plays of the designated number of plays of the wagering game before the gaming system enables the player to activate another replay feature. The gaming system may also require the player to play a number of additional plays of the wagering game (regardless of whether the gaming system has displayed an outcome for each of the designated number of plays of the wagering game) before the gaming system provides the player another opportunity to activate a replay feature. For example, after the gaming system displays an outcome for each of the designated number of plays of the wagering game, the gaming system may require the player to wager on and play an additional number of plays (e.g., ten plays) of the wagering game before enabling the player to place another replay wager. This number of additional plays may be predetermined, or the gaming system may randomly determine this number of additional plays. Alternatively, the gaming system may enable the player to activate another replay feature after a period of time from when the player placed the previous replay wager, or after a period of time from when the gaming system displayed an outcome for each of the designated number of plays of the wagering game. Various alternative embodiments of the gaming system determine when to enable the player to place another replay wager based on any suitable criteria.

It should be appreciated that any subsequent replay wager and any subsequent number of plays of the wagering game may be different from the first replay wager and the first number of plays of the wagering game. In one embodiment, the gaming system enables the player to select from a plurality of quantities of plays of the wagering game, and the gaming system determines a required replay wager to activate the replay feature based on the quantity of plays of the wagering game selected by the player. For example, the gaming system enables the player to select either five plays of the wagering game or ten plays of the wagering game. If the player selects five plays of the wagering game, the gaming system requires the player to enter a replay wager of fifty credits to activate the replay feature. If the player selects ten plays of the wagering game, the gaming system requires the player to enter a replay wager of seventy-five credits to activate the replay feature.

Figure 17:
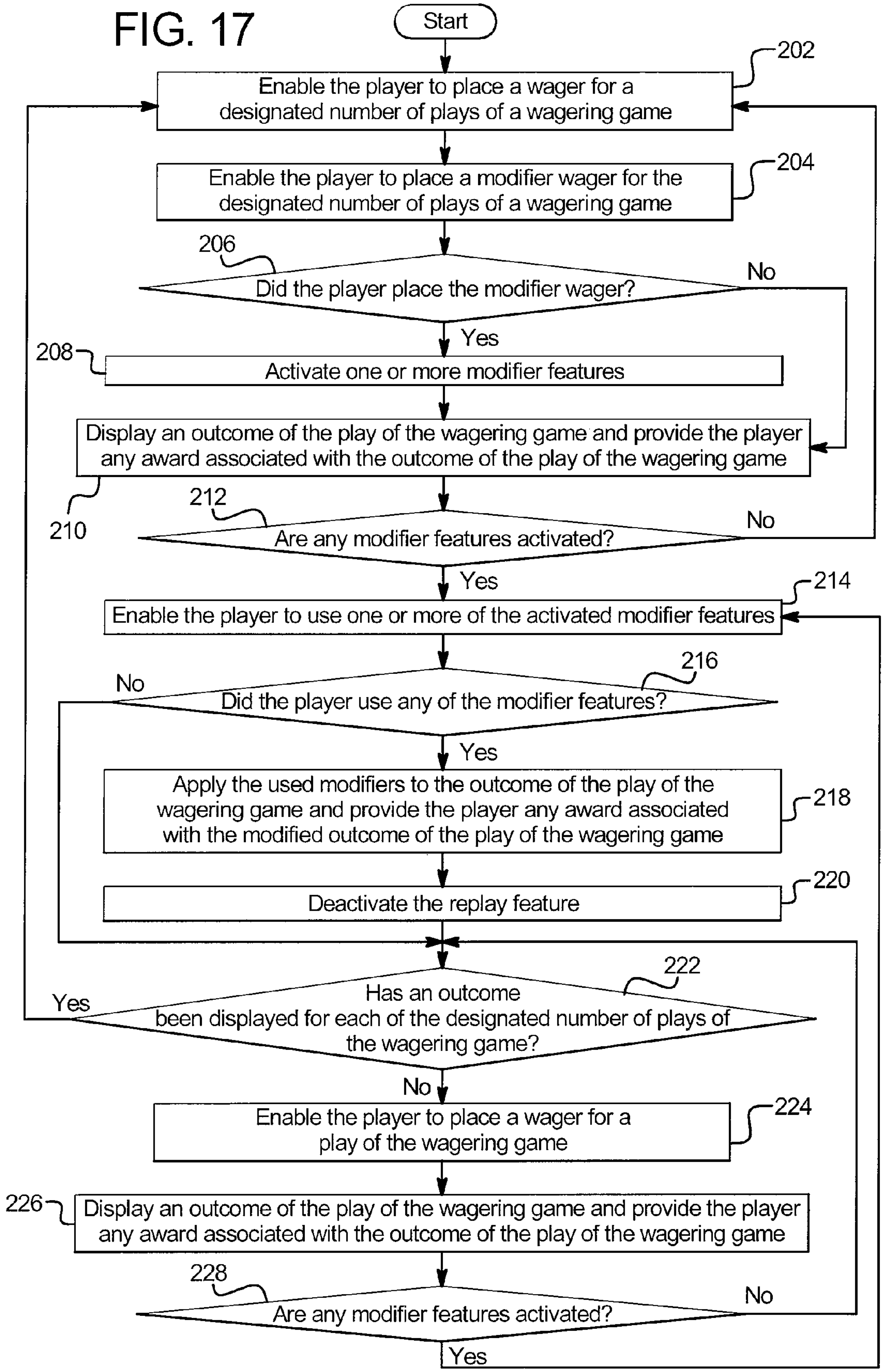
FIG. 17 is a flow chart of the operation of another embodiment of the gaming system disclosed herein.

Referring now to FIG. 17, various embodiments of the gaming system present the replay feature as a modifier feature. The gaming system enables the player to place a modifier wager for a designated number of plays of the wagering game and use the modifier feature to apply a modifier to one of the designated number of plays of the wagering game. For example, the gaming system enables the player to place a modifier wager to activate a 3× multiplier, which the player can apply to one the plurality of plays of the wagering game. If the player uses the 3× multiplier for a play of the wagering game, the gaming system awards the player three times the amount the player won as a result of playing the wagering game.

For example, in one embodiment, the gaming system enables a player to place a wager for a designated number of plays of a wagering game as indicated in block 202 of FIG. 17. The gaming system then enables the player to place a modifier wager as indicated in block 204. The gaming system determines whether the player placed the modifier wager as indicated by block 206. If the player placed the modifier wager, the gaming system activates one or more modifier features as indicated in block 208. If the player did not place the modifier wager, the gaming system does not activate any modifier features. After determining whether the player placed the modifier wager, the gaming system displays an outcome of the play of the wagering game and provides the player any award associated with the outcome of the play of the wagering game as indicated in block 210.

After displaying the outcome of the play of the wagering game, the gaming system determines if any modifier features are activated as indicated by block 212. As indicated by block 214, if one or more of modifier features are activated, the gaming system enables the player to use one or more of the activated modifier features for the play of the wagering game. If no modifier features are activated, the gaming system again enables the player to place a wager for a designated number of plays of the wagering game as indicated by block 202, and the gaming system repeats the steps indicated by blocks 202 through 212.

If the gaming system determines that one or more modifier features are activated and the player chooses to use one or more of the activated modifiers for the play of the wagering game, the gaming system applies the modifier used by the player to the outcome of the play of the wagering game and provides the player with any award associated with the modified outcome of the play of the wagering game (as indicated by block 218). The gaming system then deactivates the used modifier feature as indicated by block 220. The gaming system then determines whether an outcome has been displayed for each of the designated number of plays of the wagering game, as indicated by block 222. If an outcome has been displayed for each of the designated number of plays of the wagering game, the gaming system again enables the player to place a modifier wager as indicated by block 202. If the gaming system determines that an outcome has not been displayed for each of the designated number of plays of the wagering game, the gaming system enables the player to enter a wager for another one of the designated number of plays of the wagering game, as indicated by block 224. The gaming system then displays an outcome of the play of the wagering game as indicated by block 226, and determines if any modifier features are activated as indicated by block 228. If so, the gaming system repeats the steps indicated by blocks 214 through 222 until the gaming system has displayed an outcome for each of the designated number of plays of the wagering game. As indicated by block 222, if an outcome has been displayed for each of the designated plays of the wagering game, the gaming system again enables the player to place a modifier wager as indicated by block 202.

Figure 18:
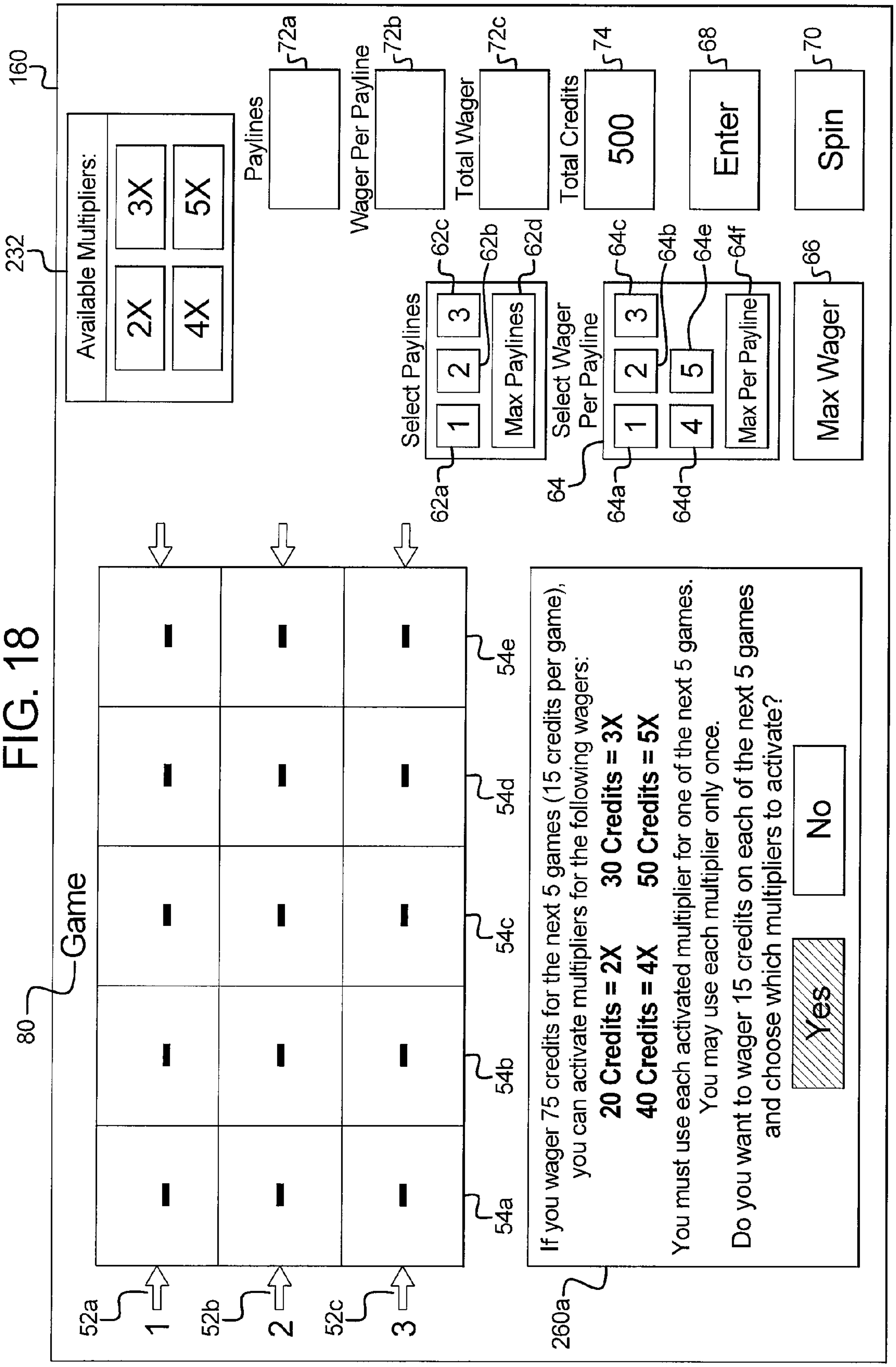
FIG. 18 is an enlarged view of one of the displays of an example of the embodiment of FIG. 17, and illustrates an example of the operation of the embodiment of FIG. 17.
Figure 19:
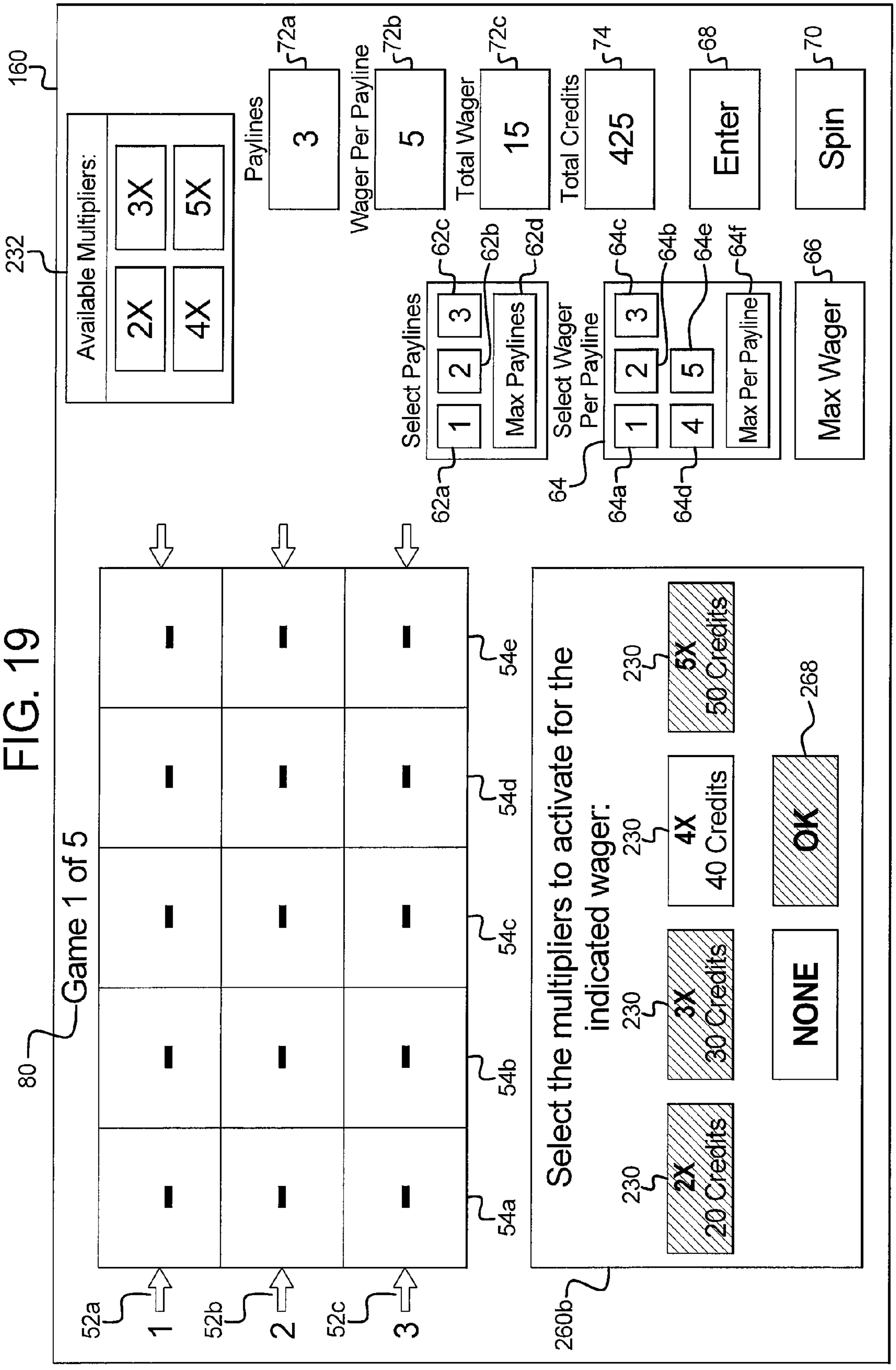
FIG. 19 is an enlarged view of the display of the example of FIG. 18, and illustrates activation of the modifier feature for the group of five plays of the wagering game.

Referring now to FIG. 18, the gaming system enables the player to place a wager of 75 credits for five plays of the wagering game (i.e., 15 credits per play). The player initially has 500 credits as shown by credit meter 74. Message 260*a* informs the player that if the player places the 75 credit wager, the player may activate multipliers (i.e., 2×, 3×, 4×, and 5×) for an additional modifier wager (i.e., 20 credits, 30 credits, 40 credits, and 50 credits, for the 2×, 3×, 4×, and 5× multipliers, respectively). The player places the seventy-five credit wager for the five plays of the wagering game. Referring to FIG. 19, the gaming system debits 75 credits from the player's total credits and credit meter 74 indicates that the player has 425 total credits remaining.

Figure 20:
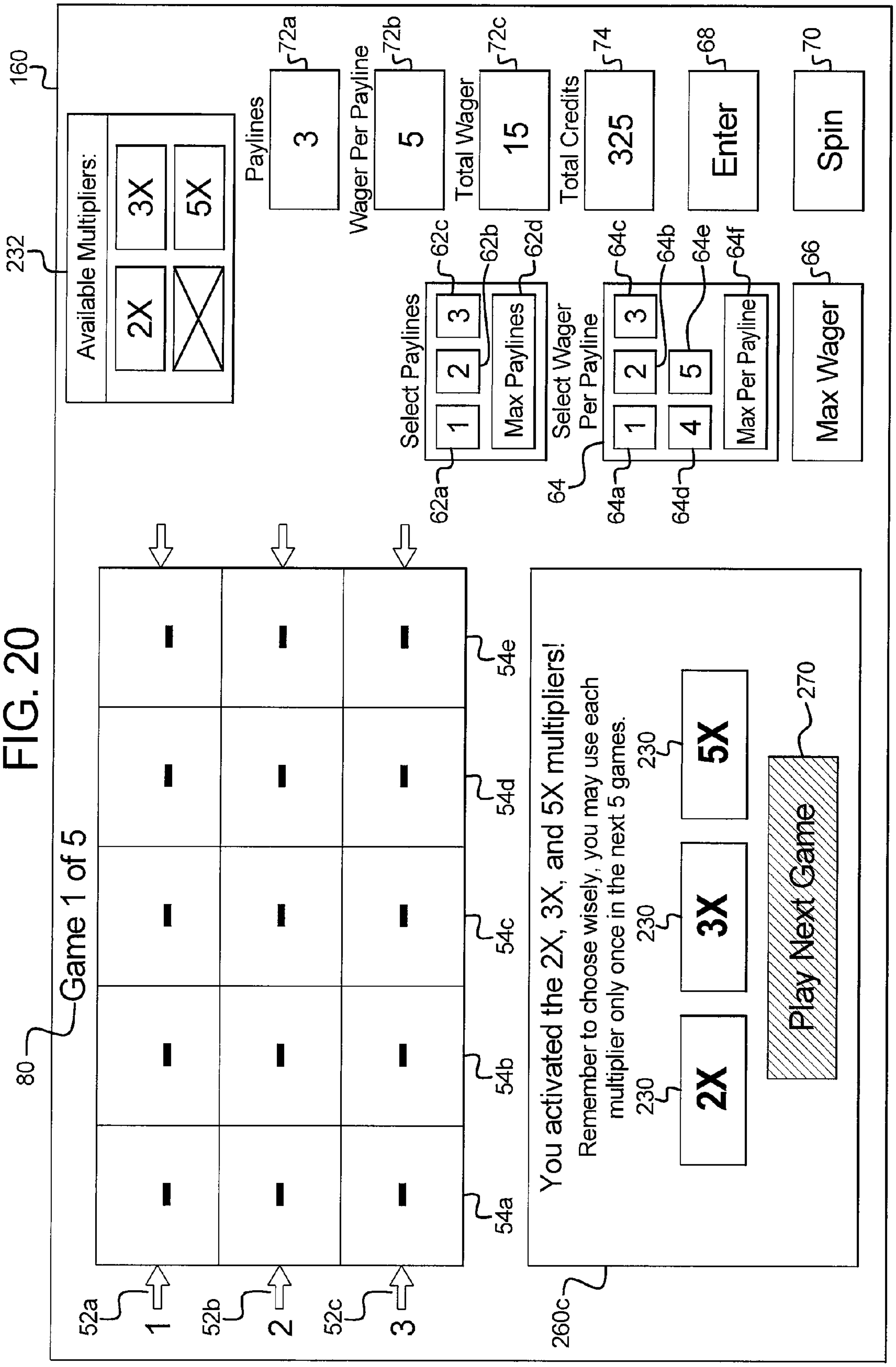
FIG. 20 is an enlarged view of the display of the example of FIG. 18, and illustrates activation of the modifier feature for the group of five plays of the wagering game.

The gaming system provides the player with an opportunity to place the modifier wagers to activate the multipliers for the five plays of the wagering game. Using select multiplier buttons 230 of touch screen 160, the player selects the 2×, 3×, and 5× multipliers for the five plays of the wagering game, and presses OK button 268 to set the modifier wagers and activate the selected multipliers. As illustrated in FIG. 20, message 260*c* informs the player that the 2×, 3×, and 5× multipliers are activated for the five plays of the wagering game. The gaming system debits 20 credits, 30 credits, and 50 credits (i.e., 100 credits total) for the 2×, 3×, and 5× multipliers, respectively, from the player's total credits. Credit meter 74 indicates that the player has 325 total credits remaining after placing the 75 credit wager for the five plays of the wagering game and the 100 credit modifier wager. Available multipliers display 232 displays the multipliers which are activated and therefore available for the player to use.

Figure 21:
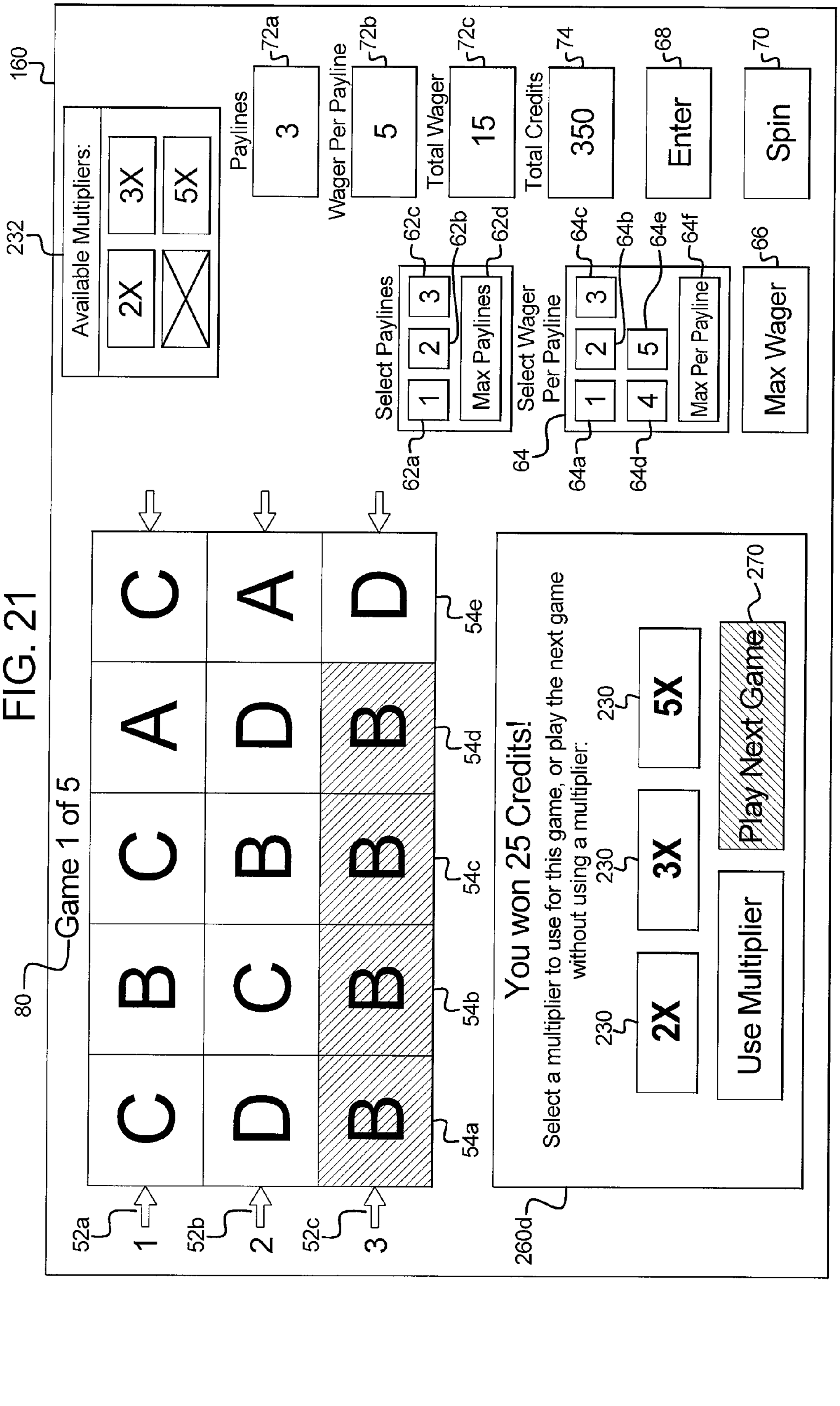
FIG. 21 is an enlarged view of the display of the example of FIG. 18, and illustrates the outcome for the first play of the wagering game.

The player uses play next game button 270 to play the first play of the wagering game. Referring now to FIG. 21, the gaming system randomly generates and displays the outcome for Game 1. The combination of four "B" symbols indicated on the third payline 52*c* is a winning symbol combination. The gaming system provides the player the award of 25 credits associated with the winning symbol combination. Accordingly, the gaming system displays message 260*d* to indicate the award to the player, and the number of credits displayed by total credit meter 74 increases by 25 credits to 350 credits. Game number display 80 indicates that the gaming system is displaying the first of five plays of the wagering game for which the player may use the activated multipliers. After displaying the outcome for Game 1, the gaming system enables the player to use one or more of the activated multipliers for the play of the wagering game as indicated by message 260*d*. In this illustrated example, however, the player uses play next game button 270 to play the next play of the wagering game without using any of the modifiers for the first play of the wagering game.

Figure 22:
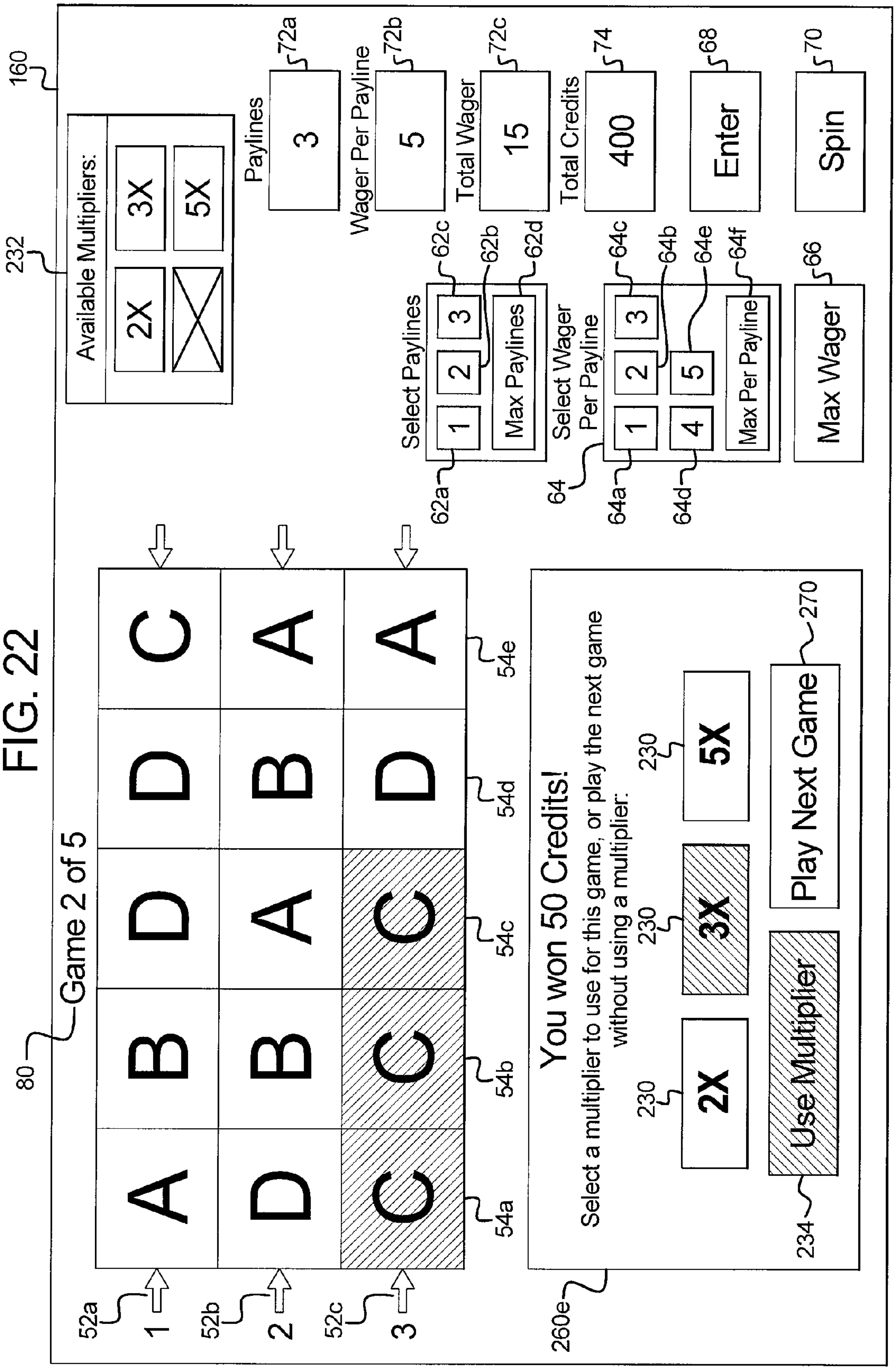
FIG. 22 is an enlarged view of the display of the example of FIG. 18, and illustrates the outcome for the second play of the wagering game.

In this embodiment, the gaming system does not require the player to place an additional wager for the second play of the wagering game because the player's 75 credit wager placed before the first play of the wagering game includes the wager (i.e., 15 credits) for each of the five plays of the wagering game. Accordingly, after the player uses play next game button 270, the gaming system generates and displays the outcome of Game 2 as illustrated by FIG. 22. The combination of three "C" symbols displayed on payline three 52*c* results in an award of 50 credits for the second play of the wagering game, as indicated by message 260*e*.

The player wagered 15 credits on the second play of the wagering game and won 50 credits for a net of 35 credits. However, the gaming system enables the player to use the 2×, 3×, or 5× multipliers to win 100, 150, or 250 credits, respectively, instead of providing the 50 credit award for the second play of the wagering game. Additionally, the gaming system enables the player to use any combination of the activated multipliers for the play of the wagering game. In this example embodiment, if the player uses the 3× and 5× multipliers together, the gaming system multiplies the award provided to the player by 8× (i.e., the gaming system adds the 3× multiplier and the 5× multiplier for a total multiplier of 8×) and provides the player 400 credits.

Figure 23:
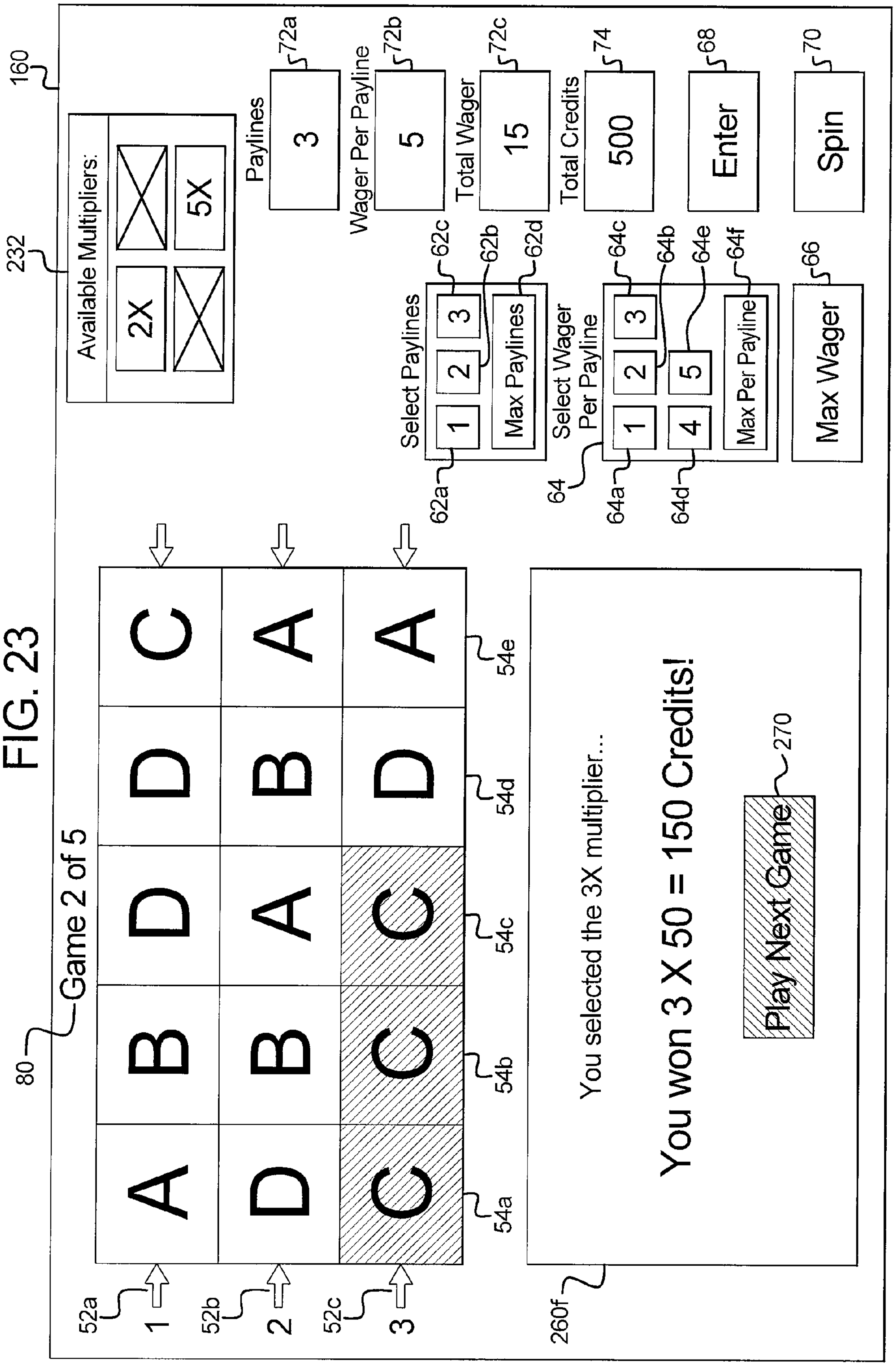
FIG. 23 is an enlarged view of the display of the example of FIG. 18, and illustrates the use of the modifier feature for the second play of the wagering game.

Referring again to FIG. 22, the player uses select multiplier buttons 230 to select the 3× multiplier, and then presses use multiplier button 234 to enter the selected multiplier for the second play of the wagering game. As illustrated by FIG. 23, message 260*f* informs the player that the player used the 3× multiplier for the second play of the wagering game, which resulted in an award of 150 credits. The gaming system adds 150 credits to the player's total credits and total credit meter 74 indicates that the player has 500 credits remaining after the second play of the wagering game. The gaming system deactivates the 3× multiplier and available multipliers display 232 indicates that the 3× multiplier is no longer available.

Figure 24:
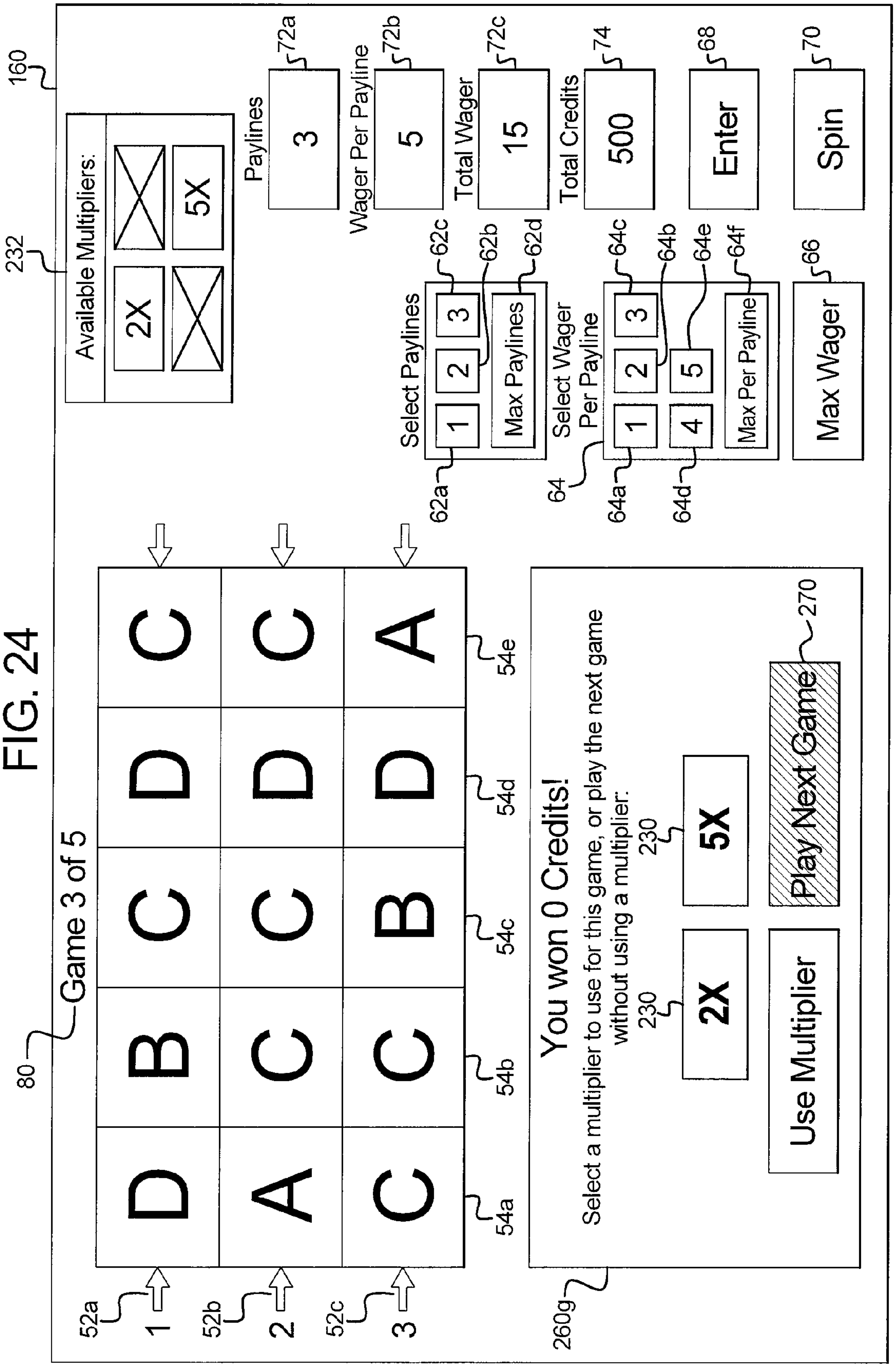
FIG. 24 is an enlarged view of the display of the example of FIG. 18, and illustrates the outcome for the third play of the wagering game.

The player uses play next game button 270 to play the third play of the five plays of the wagering game. Referring to FIG. 24, the gaming system generates and displays the outcome for Game 3. Message 260*g* indicates that the player did not win an award for the third play of the wagering game, and the gaming system enables the player to use the remaining activated multipliers (i.e., the 2× and 5× multipliers). However, since the outcome of Game 3 is not a winning outcome, the player uses play next game button 270 to play the fourth play of the wagering game without using the multipliers.

Figure 25:
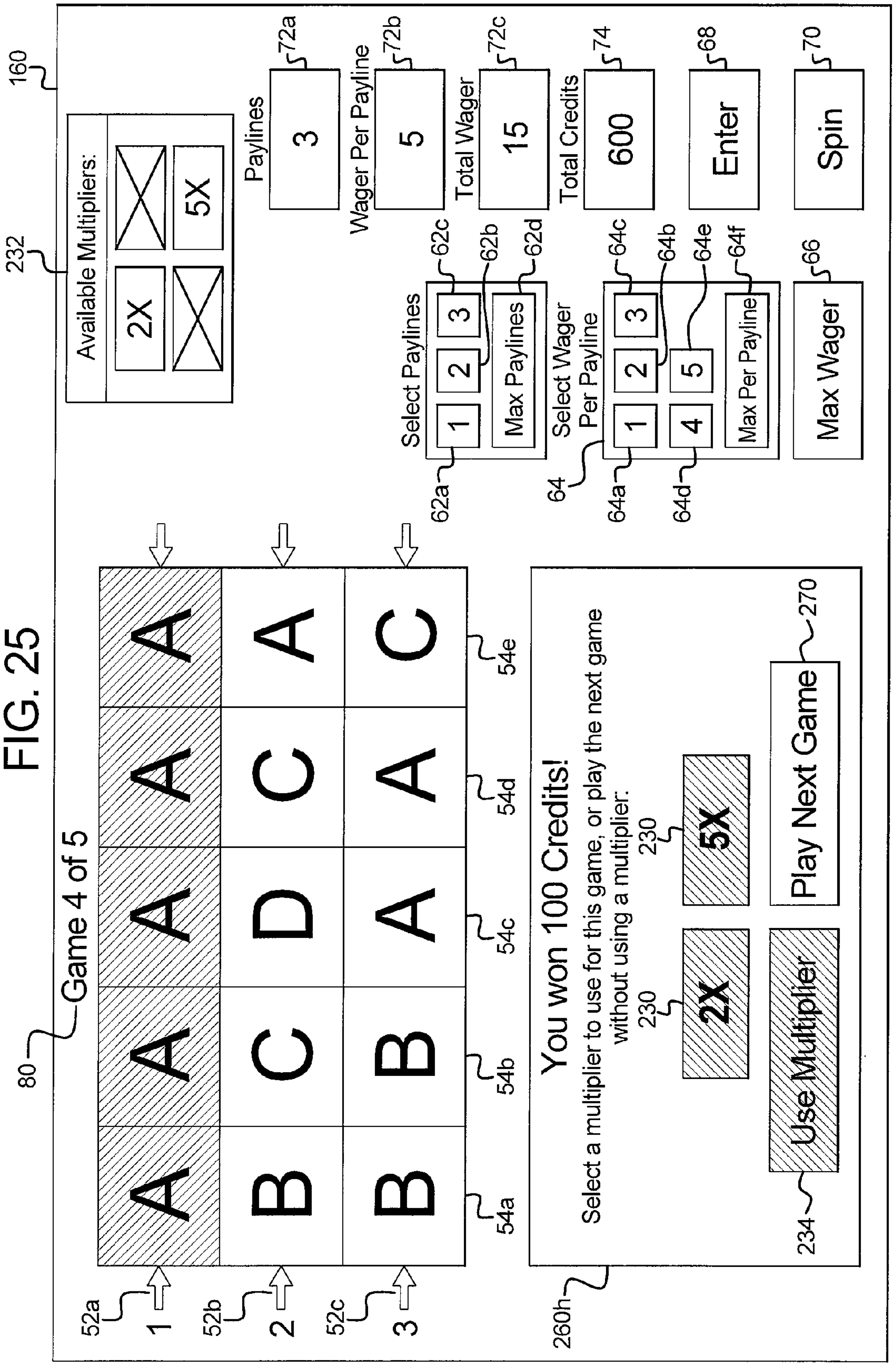
FIG. 25 is an enlarged view of the display of the example of FIG. 18, and illustrates the outcome for the fourth play of the wagering game.

As illustrated by FIG. 25, the gaming system generates and displays an outcome for Game 4. The combination of five "A" symbols on payline 52*a* results in an award of 100 credits. Message 260*h* informs the player that the player may use activated 2× multiplier and the activated 5× multiplier for Game 4. Since the prayer wagered 15 credits and won 100 credits for Game 4, it is advantageous for the player to use the multipliers for the fourth play of the wagering game. The player uses select multiplier buttons 230 to select the 2× and 5× multipliers. The player presses use multiplier button 234 to use the multipliers for the fourth play of the wagering game.

Figure 26:
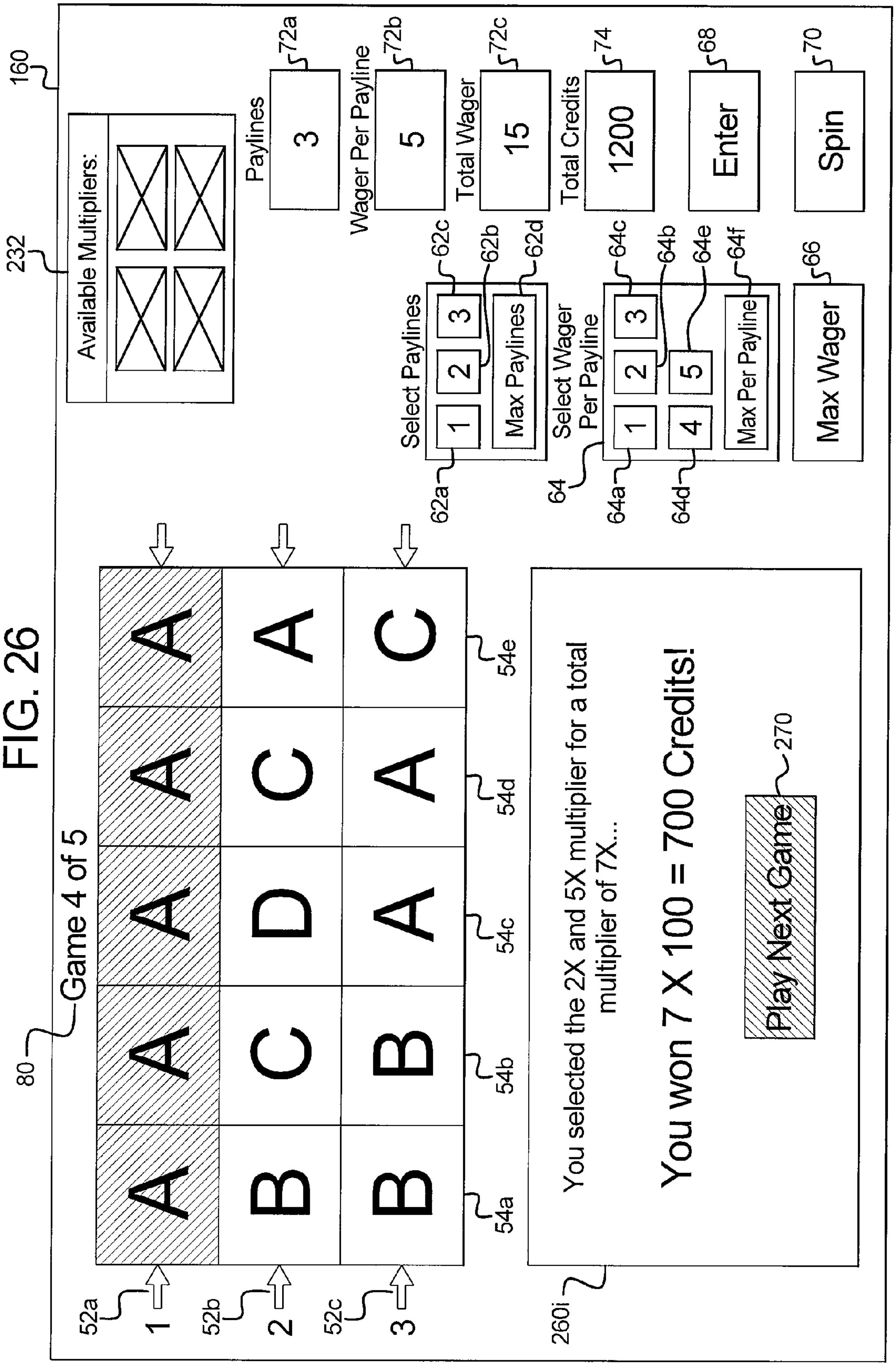
FIG. 26 is an enlarged view of the display of the example of FIG. 18, and illustrates the use of the modifier feature for the fourth play of the wagering game.

Referring to FIG. 26, message 260*i* informs the player that the 2× and 5× multipliers are combined for a total multiplier of 7×, and informs the player that the modified award for the fourth play of the wagering game is 700 credits. Credit meter 74 indicates that the player has 1200 credits after using the multipliers for Game 4. Available multipliers display 232 indicates that no multipliers are available for the remaining plays of the wagering game. The player uses play next game button 270 to play the fifth play of the wagering game.

Figure 27:
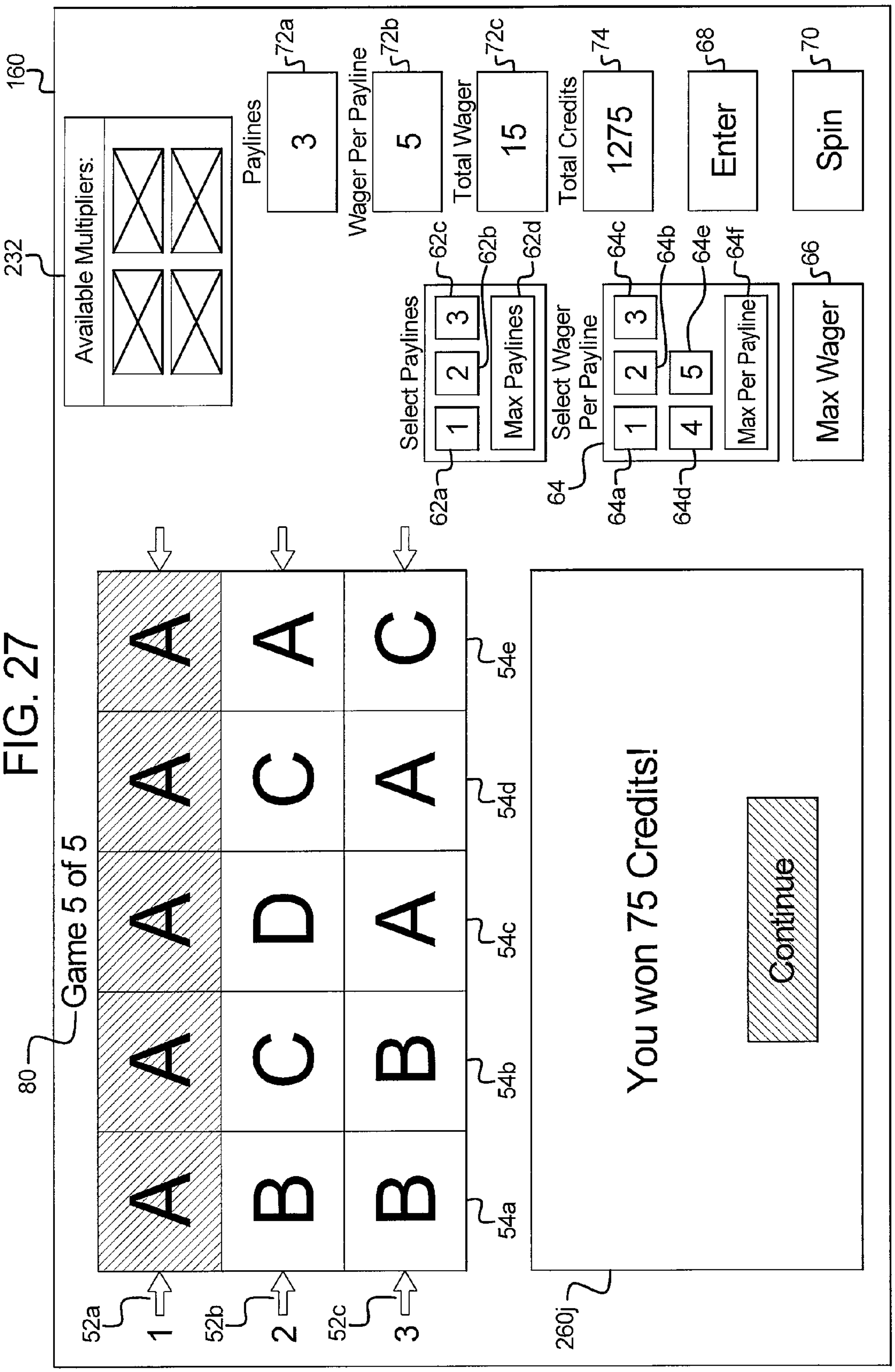
FIG. 27 is an enlarged view of the display of the example of FIG. 18, and illustrates the outcome for the fifth play of the wagering game.
Figure 28:
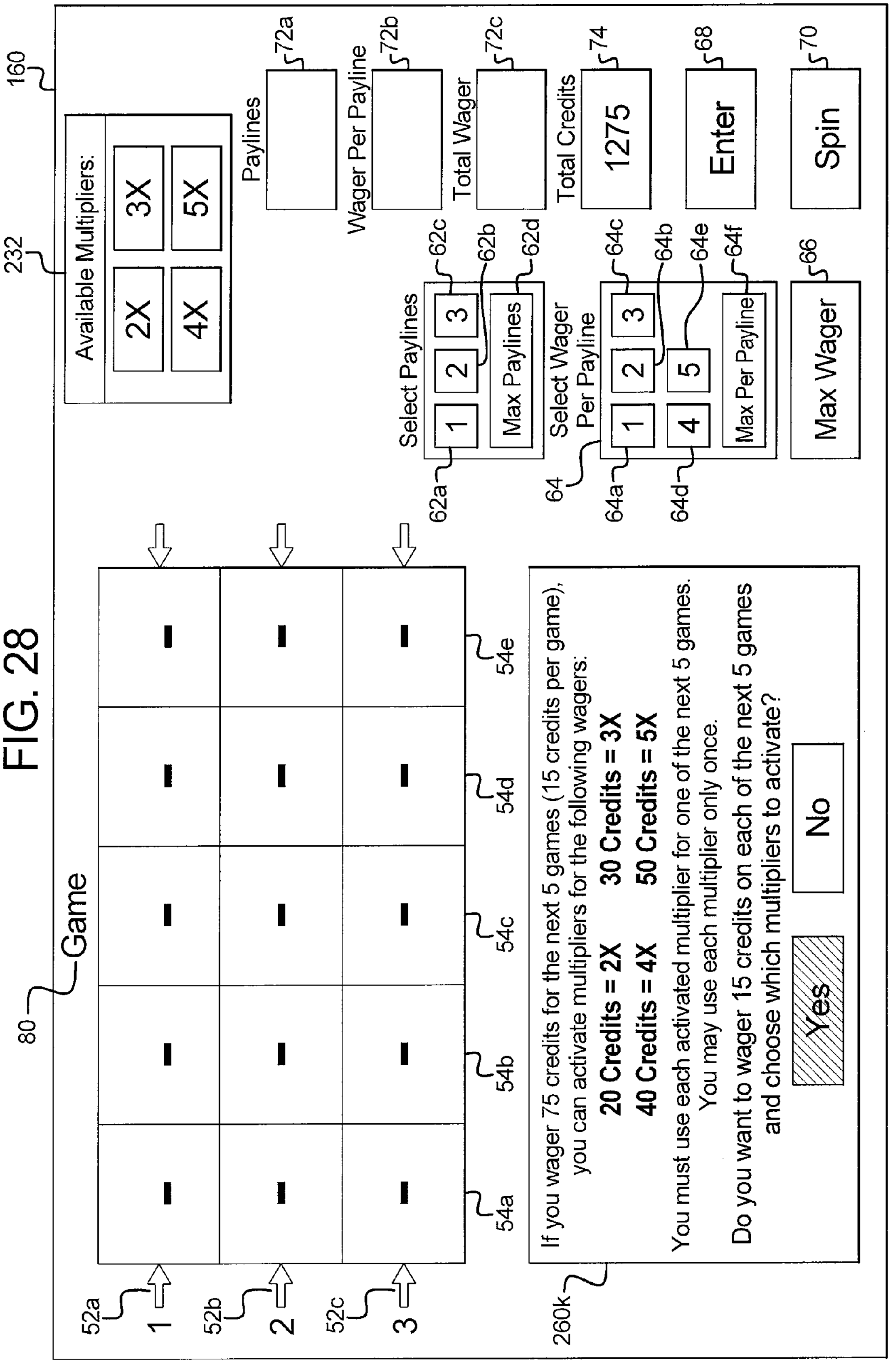
FIG. 28 is an enlarged view of the display of the example of FIG. 18, and illustrates the activation of an additional modifier feature for an additional group of five plays of the wagering game.

The gaming system generates and displays the fifth play of the wagering game as illustrated by FIG. 27. The combination of four "D" symbols on payline 52*c* results in an award of 75 credits. Since the player used all of the activated multipliers for the previous play of the wagering game, the gaming system does not enable the player to use any multipliers for the fifth play of the wagering game. As illustrated by FIG. 28, after the fifth play of the wagering game, the gaming system enables the player to wager on an additional group of five plays of the wagering game and activate additional multipliers for the five plays of the wagering game.

In various embodiments, the number of modifier wagers the player may place, and the number and magnitude of the modifiers vary. In one embodiment, the gaming system enables the player to place a plurality of modifier wagers to activate a plurality of modifiers. The modifiers may each have the same magnitude, or the modifiers may have different and/or same magnitudes. The modifier wagers required to activate the modifiers may be the same, or may increase or decrease with an increase or decrease in the magnitude of the modifiers.

In various embodiments, the magnitude of the modifier is based on the base wager for one or more plays of the wagering game. For example, in one embodiment, the gaming system enables the player to place a wager on five plays of the wagering game. If the player wagers fifty credits for the five plays of the wagering game, the player activates a 10× multiplier for the five plays of the wagering game. If the player wagers 100 credits for the five plays of the wagering game, the player activates a 5× multiplier for the five plays of the wagering game. The magnitude of the modifier may increase or decrease with an increase in the wager for the one or more plays of the wagering game. Alternatively, the magnitude of the modifier may vary for each play of the wagering game based on the base wager for the play of the wagering game. For example, in one embodiment, the gaming system enables the player to place a base wager of one to five credits for each play of the wagering game. If the player wagers one credit, the gaming system enables the player to use a 10× multiplier for the play of the wagering game. If the player wagers four credits, the gaming system enables the player to use a 3× multiplier for the play of the wagering game. The magnitude of the modifier may increase or decrease with an increase in the wager for the one or more plays of the wagering game. The magnitude of the modifier may vary based on the number of paylines wagered, the amount wagered per payline, and/or any suitable base wager criteria.

In one embodiment, the gaming system enables the player to place one or more of a plurality of different modifier wagers. Each modifier wager is associated with an average expected modifier magnitude. If the player places one of the modifier wagers, the gaming system determines the magnitude of the modifier based in part on the average expected modifier magnitude associated with the wagered modifier wager. For example, the gaming system enables the player to place modifier wagers of 25 credits and/or 100 credits. If the player places the 25 credit modifier wager, the gaming system randomly selects and activates either a 5× multiplier or a 15× multiplier (wherein the average expected multiplier is 10×). If the player places the 100 credit modifier wager, the gaming system randomly selects and activates either a 10× multiplier or a 20× multiplier (wherein the average expected multiplier is 15×). The gaming system may randomly select and activate one of a plurality of modifiers, a modifier from a range of modifiers, or a modifier based on a probability distribution.

Alternatively, the average expected modifier magnitudes associated with the modifier wagers may be the same, but the range of possible modifier magnitudes may vary. For example, in one embodiment, the gaming system enables the player to place a first modifier wager of 50 credits and/or a second modifier wager of 100 credits. If the player places the first modifier wager, the gaming system randomly selects and activates either a 10× multiplier or a 20× multiplier (wherein the average expected multiplier is 15×). If the player places the second modifier wager, the gaming system randomly selects and activates either a 5× multiplier or a 25× multiplier (wherein the average expected multiplier is also 15×). In an alternative embodiment, the amounts of the modifier wagers are different, while the average expected modifier magnitudes associated with the modifier wagers remain the same.

In one embodiment, the gaming system enables the player to place a modifier wager to activate a first modifier, and an additional modifier wager to activate a second modifier for a plurality of plays of the wagering game. The player can use the first modifier and the second modifier individually to modify two separate plays of the wagering game and/or in combination to modify one or more plays of the wagering game. The gaming system may require the player to use each modifier in a predetermined order, a randomly determined order, or the gaming system may enable the player to use each modifier in any desired order. Alternatively, the gaming system may randomly select one of the activated modifiers before, during, or after one of the number of plays of the wagering game and enable the player to use only the selected modifier for the play of the wagering game. The gaming system may display the modifier (whether predetermined, randomly selected, or player selected) to the player before or after the player chooses whether to use the modifier for the play of the wagering game.

In one embodiment, the gaming system enables the player to place a first modifier wager to activate a modifier feature for a first plurality of plays of the wagering game. The gaming system also enables the player to place a second modifier wager to activate a second modifier feature for a second different plurality of plays of the wagering game. The number of plays of the first plurality of plays of the wagering game and the number of plays of the second plurality of plays of the wagering game may be the same or different. Additionally, the first plurality of plays of the wagering game may include one or more of the plays of the second plurality of plays of the wagering game. For example, in one embodiment, the gaming system enables the player to activate a first modifier feature for the next five plays of the wagering game and a second different modifier feature for the next ten plays of the wagering game. Alternatively, the gaming system enables the player to activate a first modifier feature for five plays of the wagering game. After displaying an outcome for the first play of the five plays of the wagering game, the gaming system enables the player to activate a second modifier for the subsequent five plays of the wagering game. The gaming system enables the player to use the first modifier and/or the second modifier for the remaining four plays of the wagering game for which the first modifier is activated. Alternatively, the gaming system may require the player to use the first and second modifiers in combination for one of the next four plays of the wagering game or separately for different plays of the wagering game.

In one embodiment, the gaming system enables the player to forfeit (i.e., sacrifice) a portion or all of one or more modifiers to apply a different modifier to a play of the wagering game. For example, if a player activates a 2× modifier and a 3× modifier, the player can use the 2× modifier for a first play of the wagering game, and the 3× modifier for a later play of the wagering game. Alternatively, the gaming system enables the player to use a 4× modifier for the first play of the wagering game, if the player sacrifices the player's option to use the 3× modifier for a later play of the wagering game.

Various embodiments of the gaming system provide incentive for the player to use the modifier feature for earlier plays of the wagering game, or, alternatively, for later plays of the wagering game (and thereby increasing the player's risk or reward for delaying the player's use of the modifier until later plays of the wagering game). In one embodiment, the magnitude of the modifier increases after each play of the wagering game. For example, a player places a modifier wager to activate a 1OX multiplier for ten plays of the wagering game. The player can use the modifier feature to apply a 1× multiplier (i.e., no modification) to the first play of the wagering game. If the player does not use the modifier feature for the first play of the wagering game, the gaming system increases the 1× multiplier to a 2× multiplier. For the second play of the wagering game, the player can use the modifier feature to apply the 2× multiplier. For each subsequent play of the wagering game, the gaming system increases the multiplier by one such that the player can use the modifier to apply a 10× multiplier to the tenth play of the wagering game. In various other embodiments, the magnitude of the modifier decreases one or more times after one or more plays of the wagering game. For example, a player places a modifier wager to activate a 10× multiplier for ten plays of the wagering game. The player can use the modifier feature to apply a 10× multiplier to the first play of the wagering game. If the player does not use the modifier feature for the first play of the wagering game, the gaming system decreases the 10× multiplier to a 9× multiplier. For the second play of the wagering game, the player can use the modifier feature to apply only the 9× multiplier. For each subsequent play of the wagering game, the gaming system decreases the multiplier by one such that the player can use the modifier to apply only a 1× multiplier (i.e., no modification) to the tenth play of the wagering game. In other embodiments, the magnitude of the modifier feature increases or decreases only if the player does not use the modifier feature for the plurality of plays of the wagering game. For example, if the player does not use the 10× multiplier for any of the designated number of plays of the wagering game, the gaming system reduces the multiplier to a 5× multiplier, which the player can use to modify any one of the designated number of plays of the wagering game and/or for any subsequent play of the wagering game. Alternatively, the gaming system can decrease the multiplier by one for each subsequent play of the wagering game.

In another embodiment, the gaming system enables the player to sacrifice later plays of the wagering game, for which the player has already placed a wager, in exchange for applying a greater modifier to an earlier play of the wagering game. For example, a player wagers ten credits for ten plays of the wagering game (one credit per play of the wagering game), and places a 20 credit modifier wager to activate a 2× modifier for the ten plays of the wagering game. After the gaming system displays the outcome for the seventh play of the wagering game, the player can use the 2× modifier feature for the seventh play of the wagering game, and thereafter play the remaining three plays of the wagering game. Alternatively, if the player forfeits or sacrifices the remaining three plays of the wagering game, the player can use a 5× multiplier (i.e., the 2× multiplier plus an additional multiplier for each sacrificed play of the wagering game) for the seventh play of the wagering game. In various embodiments, the quantities and magnitudes of the modifiers the player may sacrifice may vary. Additionally, the quantities of the modifiers and plays of the wagering game received by the player in exchange for the sacrificed modifiers and plays of the game vary.

In an alternative embodiment, the gaming system enables the player to place one of a plurality of modifier wagers to activate one of a plurality of modifiers. The player can use the modifier feature to modify one play of the wagering game. Alternatively, the player can use a portion of the modifier to modify one play of the wagering game, and the remaining portion of the modifier to modify a different play of the wagering game. For example, a player places a modifier wager to activate a 10× multiplier for five plays of the wagering game. The gaming system enables the player to use any portion (or any whole number portion) of the multiplier for the first play of the wagering game. If the player chooses to use a 2× multiplier, the player will have an 8× multiplier remaining to use for the remaining four plays of the wagering game. In various embodiments, the quantity and magnitude of the portions of the modifier and the number of plays of the wagering game for which the player may use all or a portion of the modifier vary.

In one embodiment, if the player activates the modifier feature but does not use the modifier feature for any of the plurality of plays of the wagering game, the player cannot use the modifier feature for any subsequent plays of the wagering game unless the player places an additional modifier wager. In another embodiment, the player can use the modifier feature for any subsequent play of the wagering game without placing an additional modifier wager. In one embodiment, the gaming system enables the player to place another modifier wager to activate another modifier feature after displaying an outcome for each of the number of plays of the wagering game and before displaying another outcome of a play of the wagering game. In an alternative embodiment, the gaming system enables the player to place another modifier wager to activate another modifier feature after the player uses the modifier for one of the number of plays of the wagering game and before the gaming system displays an outcome of another play of the wagering game. In various embodiments, the gaming system enables the player to extend or renew the modifier feature by placing an additional modifier wager. For example, a player places a modifier wager to activate the modifier feature for ten plays of the wagering game but does not use the modifier for any of the ten plays of the wagering game. After displaying the tenth play, the gaming system enables the player to place an additional modifier wager to keep the modifier feature active for an additional five plays of the wagering game. The amount of the additional modifier wager and the number of plays of the wagering game for which the additional modifier wager activates the modifier feature vary. Additionally, the gaming system may enable the player to select the number of wagering games for which to extend the modifier feature.

In various embodiments, if the player activates the modifier feature but does not use the modifier feature for any of the plurality of plays of the wagering game, the gaming system refunds all or a portion of the player's modifier wager. The gaming system may refund the modifier wager at a discounted rate, or may reduce the modifier wager by a predetermined amount for the refund. The gaming system also may provide the player with a discount on the cost of extending the modifier feature for additional plays of the wagering game and/or placing an additional wager to activate an additional modifier feature. Alternatively, the gaming system may provide the refund as non-cashable credits, player tracking points, one or more vouchers for goods and/or services, and/or any suitable form of value to the player.

In another embodiment, the gaming system enables the player to sacrifice the player's option use the modifier feature in exchange for additional plays of the wagering game without placing an additional wager. The player can use the all or a portion of an unused modifier feature to purchase additional plays of the wagering game before, during, or after playing the plurality of plays of the wagering game. Alternatively, the gaming system enables the player to sacrifice a portion of the modifier feature in exchange for additional plays of the wagering game for which the player may use the remaining portion of the modifier. For example, the player activated a 10× multiplier for 10 plays of the wagering game, but did not use the multiplier for the first five plays of the wagering game. The gaming system enables the player to sacrifice a portion (e.g., 2×) of the 10× multiplier (resulting in an 8× multiplier) in exchange for three additional plays of the wagering game for which the player may use the non-sacrificed portion of the multiplier (i.e., 8×). Thus, the player may use the non-sacrificed portion of the multiplier (i.e., 8×) for the next eight plays of the wagering game (instead of a 10× multiplier for the next five plays of the wagering game).

In one alternative configuration of the present disclosure, a central server is configured to communicate with one or more gaming devices. Each gaming device of the gaming system includes one or more wagering games, which are locally controlled by a gaming device processor of the gaming device. In one embodiment, each gaming device is configured to operate with the central server to enable a gaming system wagering event controlled by the central server to be output or displayed on the gaming device before or during a play of the wagering game. The gaming system wagering event enables the player to activate a replay or modifier feature by placing a gaming system wager. If the player activates the replay or modifier feature by placing the gaming system wager on the gaming system wagering event, the player can use the replay or modifier feature a designated number of times (such as one time) over a number of plays of the wagering game. Each time the player uses the replay or modifier feature for a play of the wagering game, the gaming system provides a gaming system award to the player based on the outcome of the play of the wagering game. The gaming system award is in addition to any gaming device award provided to the player for the play of the wagering game. It should be appreciated that the gaming system wagering event occurs independently of the wagering game of the gaming device, such that it does not modify operation of the wagering game. That is, the gaming system wagering event does not change the gaming device outcome or gaming device paytable for the play of the wagering game.

In one embodiment, upon a triggering event of a gaming device, the gaming device communicates data to the central server. The central server determines, based on the data communicated to the central server by the gaming device, whether to provide the player with a gaming system wagering event (i.e., the opportunity to activate the replay or modifier feature by placing the replay or modifier wager). If the central server provides the player with the gaming system wagering event, the central server causes the gaming device to enable the player to place the replay or modifier wager on the gaming system wagering event. If the player places the replay or modifier wager, the central server activates the replay or modifier feature. The gaming device displays an outcome of a play of the wagering game and communicates wagering game outcome data to the central server. If the replay or modifier feature is activated, the central server causes the gaming device to enable the player to use the replay or modifier feature for the play of the wagering game. If the player uses the replay or modifier feature for the play of the wagering game, the central server determines a gaming system award based on the outcome of the play of the wagering game and the replay or modifier feature. The central server then causes the gaming device to provide the player with the determined gaming system award.

For example, in one embodiment, a player places a wager on a gaming device for a play of a wagering game. Before the gaming device displays an outcome of the play of the wagering game, the gaming device communicates data to the central server about the wagering game and the wager placed by the player for the play of the wagering game. The central server causes the gaming device to provide the player with an opportunity to place a replay wager of fifty credits to activate a replay feature for five plays of the wagering game. The central server causes the gaming device to display the wagering opportunity to the player and enable the player to place the replay wager. The player uses one or more gaming device inputs to place the replay wager for the five plays of the wagering game. The gaming device communicates data to the central server about the replay wager.

The gaming device displays an outcome of the first play of the wagering game and provides the player with any awards associated with the outcome of the play of the wagering game. The gaming device then communicates data about the wagering game outcome to the central server. The central server causes the gaming device to enable the player to input the replay for the play of the wagering game. If the player uses the replay feature for the play of the wagering game, the central server determines a gaming system award to provide to the player based the outcome of the play of the wagering game and the replay feature. In this embodiment, for example, if the outcome of the play of the wagering game is associated with an award of 100 credits and the gaming device provided the player with the 100 credit award, the central server determines a gaming system award of an additional 100 credits. The central server causes the gaming device to display the gaming system award of 100 credits to the player, and provides the gaming system award to the player. The central server then deactivates the replay feature.

In this example, for each of the remaining four plays of the wagering game, the gaming device enables the player to place a wager for the play of the wagering game. The gaming device then displays an outcome of the play of the wagering game and provides the player any award associated with the outcome of the play of the wagering game. After each play of the wagering game, the gaming device communicates wagering game outcome data to the central server, and the central server determines whether the replay feature is activated. Since the player used the replay for the first play of the wagering game, the central server does not cause the gaming device to enable the player to use the replay feature for any of the four remaining plays of the wagering game. After the gaming device displays an outcome for each of the five plays of the wagering game and communicates wagering game outcome data to the central server for each of the five plays of the wagering game, the central server causes the gaming device to enable the player to place an additional replay wager to activate another replay feature for a designated number of plays of the wagering game.

It should be appreciated that the central server and one or more gaming devices may be configured to provide the player with the gaming device award and the gaming system award such that the gaming device award and the gaming system award appear to the player to be either separate awards or one total award. For example, in one embodiment, an outcome of a play of the wagering game results in a gaming device award of 50 credits. If the player uses a modifier feature to apply a 3× multiplier for the play of the wagering game, the total award provided to the player for the play of the wagering game will be 150 credits. Specifically, the player's total award will include the 50 credit gaming device award and a 100 credit gaming system award provided to the player for using the modifier feature for the play of the wagering game. In one embodiment, after the gaming device displays the 50 credit gaming device award and provides the player with the 50 credit gaming device award, the central server causes the gaming device to enable the player to use the modifier feature for the play of the wagering game. If the player uses the modifier feature, the central server causes the gaming device to display the gaming system award of 100 credits, and provide the 100 credit gaming system award to the player. In an alternative embodiment, after displaying the outcome of the play of the wagering game and before the gaming device provides the gaming device award to the player, the central server causes the gaming device to enable the player to use the modifier feature for the play of the wagering game. If the player uses the modifier feature, the central server causes the gaming device to display the 150 credit total award (i.e., the 50 credit gaming device award and the 100 credit gaming system award) for the play of the wagering game to the player, and provide the 150 credit total award for the play of the wagering game to the player. Thus, the gaming system may be configured to display the gaming device award separately from or in combination with the gaming system award and/or provide the gaming device award separately from or in combination with the gaming system award. The gaming system award may be displayed separately from the gaming device outcome, such as on a different display of the gaming device or on a different area of the gaming device display. It should therefore be appreciated that the gaming system enables the player to use one or more replay or modifier features for one or more plays of a wagering game to enhance the award provided to the player for the one or more plays of the wagering game.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) receive a replay wager from a player for a designated number of plays of a wagering game, the designated number being greater than one and the replay wager being distinct from any base wager received for any of the plays of the wagering game;

(b) activate a replay feature if the replay wager is received from the player; and (c) for at least one play of the designated number of plays of the wagering game:

(i) receive a base wager from the player for said play of the wagering game, (ii) display an outcome of said play of the wagering game, (iii) provide the player any award associated with the outcome of said play of the wagering game (iv) if the replay feature is activated for said play of the wagering game:

(A) enable the player to apply said replay for said play of the wagering game, and (B) if the player applies the replay for said play of the wagering game:

(I) redisplay the outcome of said play of the wagering game, (II) reprovide the player any award associated with the outcome of said play of the wagering game, and (III) deactivate the replay feature, and (v) if the replay feature is not activated for said play of the wagering game:

(A) not enable the player to apply any replay for said play of the wagering game, and (B) not redisplay the outcome of said play of the wagering game.

2. The gaming system of claim 1, wherein the designated number of plays of the wagering game is based on the replay wager received from the player.

3. The gaming system of claim 1, wherein the replay wager is based on the designated number of plays of the wagering game.

4. The gaming system of claim 1, wherein the plurality of instructions cause the at least one processor to receive a plurality of replay wagers from the player for the designated number of plays of the wagering game.

5. The gaming system of claim 1, wherein the plurality of instructions cause the at least one processor to receive a designated base wager from the player for at least one of the designated number of plays of the wagering game and receive a different base wager from the player for a different one of the designated number of plays of the wagering game.

6. The gaming system of claim 1, wherein the plurality of instructions cause the at least one processor to activate a plurality of replay features if the replay wager is received from the player.

7. The gaming system of claim 6, wherein the plurality of instructions cause the at least one processor to, if a plurality of replay features are activated for said play of the wagering game, enable the player to apply one or more of said replays for said play of the wagering game.

8. The gaming system of claim 7, wherein the plurality of instructions cause the at least one processor to, if the player applies one or more of said replays for said play of the wagering game, for each replay applied by the player:

(a) redisplay the outcome of said play of the wagering game, (b) reprovide the player any award associated with the outcome of said play of the wagering game, and (c) deactivate the replay feature.

9. The gaming system of claim 1, wherein the plurality of instructions cause the at least one processor to, if the replay feature is activated after displaying the outcome for each of the designated number of plays of the wagering game:

(a) enable the player to apply said replay for any one of the designated number of plays of the wagering game, and (b) if the player applies said replay for said play of the wagering game:

(i) redisplay the outcome of said play of the wagering game, (ii) reprovide the player any award associated with the outcome of said play of the wagering game, and (iii) deactivate the replay feature.

10. The gaming system of claim 1, wherein the plurality of instructions cause the at least one processor to, if the replay feature is activated after displaying the outcome for each of the designated number of plays of the wagering game:

(a) automatically apply the replay for one of the designated number of plays of the wagering game, (b) redisplay the outcome of said play of the wagering game, (c) reprovide the player any award associated with the outcome of said play of the wagering game, and (d) deactivate the replay feature.

* * * * *

UNITED STATES PATENT AND TRADEMARK OFFICE

CERTIFICATE OF CORRECTION

PATENT NO. : 8,197,335 B2
APPLICATION NO. : 12/271592
DATED : June 12, 2012
INVENTOR(S) : Daniel J. DeWaal et al.

It is certified that error appears in the above-identified patent and that said Letters Patent is hereby corrected as shown below:

In Column 37, Claim 1, Line 58, after “game” add --,--.
In Column 38, Claim 7, Line 30, replace “a” with --the--.
In Column 38, Claim 9, Line 48, replace “said play” with --one of the designated number of plays--.

Signed and Sealed this
Fourth Day of September, 2012

David J. Kappos
*Director of the United States Patent and Trademark Office*